United States Patent
Agarwal et al.

(10) Patent No.: US 7,174,379 B2
(45) Date of Patent: Feb. 6, 2007

(54) MANAGING SERVER RESOURCES FOR HOSTED APPLICATIONS

(75) Inventors: Vikas Agarwal, New Delhi (IN); Girish Chafle, Munirka New Delhi (IN); Neeran Mohan Karnik, Shivalik Colony New Delhi (IN); Arun Kumar, New Delhi (IN); Ashish Kundu, New Delhi (IN); Johara Shahabuddin, Delhi (IN); Pradeep Varma, Hauz Khas New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 09/921,868

(22) Filed: Aug. 3, 2001

(65) Prior Publication Data

US 2003/0028642 A1    Feb. 6, 2003

(51) Int. Cl.
*G06F 15/173*    (2006.01)
*G06F 9/445*    (2006.01)

(52) U.S. Cl. ............... 709/226; 709/229; 709/104; 709/105; 717/162; 717/163; 717/164; 717/165; 717/166; 717/167

(58) Field of Classification Search ............ 709/226, 709/229, 104, 105; 705/412; 718/104, 105, 718/1, 100; 717/162–167; 719/312; 707/104.1
See application file for complete search history.

(56) References Cited

U.S. PATENT DOCUMENTS

| | | | |
|---|---|---|---|
| 5,574,914 A | | 11/1996 | Hancock et al. |
| 5,790,868 A | * | 8/1998 | Hotea et al. ............... 718/104 |
| 5,949,977 A | | 9/1999 | Hernandez |
| 6,086,618 A | * | 7/2000 | Al-Hilali et al. ............. 709/226 |
| 6,088,732 A | * | 7/2000 | Smith et al. ............... 709/229 |
| 6,182,109 B1 | * | 1/2001 | Sharma et al. .............. 709/226 |

(Continued)

FOREIGN PATENT DOCUMENTS

EP    0 905 621 A1    3/1999

(Continued)

OTHER PUBLICATIONS

Microsoft Computer Dictionary, Published 1997, p. 198.*

(Continued)

*Primary Examiner*—John Follansbee
*Assistant Examiner*—Ashok Patel
(74) *Attorney, Agent, or Firm*—Gibb I.P. Law Firm, LLC; T. Rao Coca, Esq.

(57) ABSTRACT

In an ASP server farm, requests to use an application are directed to a particular executing instance of the application (or an appropriate component thereof) that is identified as being the least loaded of the available such instances of the application or its component. The number of such instances is dynamically increased or decreased in response to the number of requests for the application or components thereof. Requests may be directed (in accordance with the first aspect) or the instances adjusted (in accordance with a second aspect) on a per client-basis, in which instances of the application and/or components thereof are reserved for the use of a user or a particular group of users. Operation in this manner facilitates compliance with service agreements with respective users or groups of users.

13 Claims, 11 Drawing Sheets

U.S. PATENT DOCUMENTS

| | | | |
|---|---|---|---|
| 6,327,622 B1* | 12/2001 | Jindal et al. | 718/105 |
| 6,578,068 B1* | 6/2003 | Bowman-Amuah | 709/226 |
| 6,631,425 B1* | 10/2003 | Helland et al. | 719/332 |
| 6,665,701 B1* | 12/2003 | Combs et al. | 718/104 |
| 6,711,607 B1* | 3/2004 | Goyal | 709/226 |
| 6,763,519 B1* | 7/2004 | McColl et al. | 718/104 |
| 6,868,539 B1* | 3/2005 | Travison et al. | 717/100 |
| 2002/0059427 A1 | 5/2002 | Tamaki et al. | |
| 2002/0166117 A1* | 11/2002 | Abrams et al. | 717/177 |
| 2002/0194324 A1* | 12/2002 | Guha | 709/223 |

FOREIGN PATENT DOCUMENTS

| | | |
|---|---|---|
| EP | 0905621 A | 3/1999 |
| EP | 1115061 A | 7/2001 |
| EP | 1117034 A | 7/2001 |
| EP | 1 170 662 A2 | 1/2002 |
| JP | 08-044576 | 2/1996 |
| JP | 10-105500 | 4/1998 |
| JP | 2001-117887 | 4/2001 |
| JP | 2001-319153 | 11/2001 |
| JP | 2001-358767 | 12/2001 |
| WO | WO 01/14987 A3 | 3/2001 |
| WO | WO 02/01346 A2 | 1/2002 |
| WO | WO 02/001346 A3 | 1/2002 |

OTHER PUBLICATIONS

U.S. Appl. No. 60/232,052, filed Sep. 12, 2000.*

"Interfacing Condor and PVM to Harness the Cycles of Workstation Clusters", Pruyne et al., Future Generations Computer Systems, Elsevier Science Publishers, Amsterdam, NL, vol. 12, No. 1, May 1, 1996, 19 pages.

International Search Report, 4 pages.

Iizawa, et al., "Very Large Ditributed Database Systems for Information Broadcasting." 113-44, Jul. 15, 1997, pp. 263-268, Abstract.

* cited by examiner

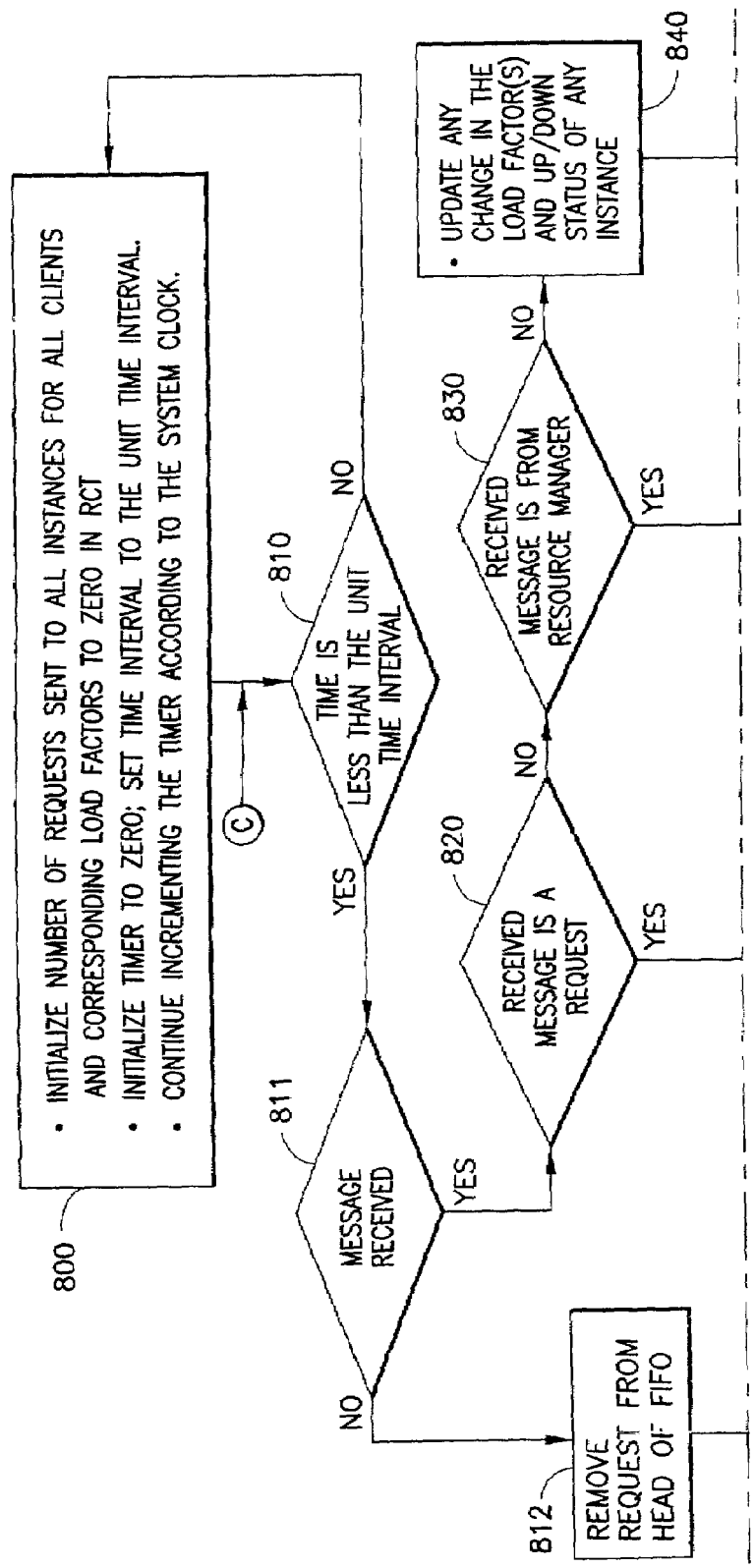

MANAGING SERVER RESOURCES FOR HOSTED APPLICATIONS

FIELD OF THE INVENTION

The invention relates to managing server resources for providing access to hosted applications to third parties and relates particularly, though not exclusively, to the automated management of servers operated by application service providers.

BACKGROUND

An application service provider (ASP) hosts applications for multiple customers (that is, client organisations), using a shared computing infrastructure, often termed a server farm. The ASP takes advantage of economies of scale (in terms of redundancy, peak load handling, technical skills, etc.), and of the need for customers to focus on core competencies rather than complex information technology management. Since the computing infrastructure is owned by the ASP and shared amongst customers, the ASP has ample opportunity for improving the utilization of its resources, and hence providing a cost-effective service.

In view of the above, there is a clear trend for corporate users to outsource their applications through ASPs, for economic, technological, and competitive reasons. At present, most ASPs provide simple services such as web hosting, with particular servers dedicated to respective customers. Other ASPs allow servers to be shared in relatively static manner, with very simple service level agreements (SLAs) governing the provision of these services.

One existing approach to improving machine use involves the allocation and deallocation of entire machines between customers. This approach requires the customer to specify their needs in terms of lower and upper limits on number of machines at that customer's disposal, implying the need for the customer to be technically knowledgeable. This is a reasonable proposition for large corporate clients, but is generally not suitable for small and medium sized enterprises.

An improved arrangement has been proposed by Ensim Corporation of Sunnyvale, Calif. This proposed arrangement provides application hosting using the concept of machine fractions. Ensim's solution allows ASPs to securely share server resources between customers, as well as manage the deployment of applications across the server farm by supporting what are termed private servers (PSs). Each PS can run any off-the-shelf applications supported on the physical server. The Ensim system also offers management primitives for recovering failed PSs, migrating customers across PSs and machines, and increasing PS resources manually. From a single console, ASPs can provision and manage multiple PSs. The applications to be hosted need only be web-hosting ready, and do not need any further modifications.

Despite various advantages, the arrangement proposed by Ensim has various limitations. The PSs are relatively static in the sense that each PS guarantees a minimum availability of physical server resources. As a result, the solution provided by Ensim is still relatively inefficient in its use of resources. Also, system management must be done manually, via a console.

In view of the above, a need clearly exists for an improved solution for hosting applications which at least attempts to address these and other limitations associated with existing techniques.

SUMMARY

Customers often do not require dedicated hardware from their ASPs. Their staff's requirements are typically small enough that the requirements of multiple customers can be simultaneously met by hosting them on a single machine in a server farm. Accordingly, fractional hosting (that is, allocating only fractions of machines to particular customers) is thus generally desirable. This allows for the provision of high-end services, while sharing the cost burden of expensive machines and software between clients. In this respect, a flexible regime for providing fractional hosting is provided using the notion of "virtual" servers, which is described later.

Requests directed at an application are forwarded to a particular executing instance of the application (or an appropriate component thereof) that is identified as being the least loaded of the available such instances of the application or its component. The number and/or capacity of such instances is dynamically increased or decreased in response to the varying number of requests for the application or components thereof.

Requests are directed or the instances adjusted on a per client-basis. That is, instances of the application and/or components thereof are reserved for the use of an individual, customer or a particular group of customers. Operation in this manner facilitates compliance with service agreements with respective entities.

A record is maintained of the resources currently allocated and resources currently consumed for each combination of instance and customer, in terms of load factors placed on the instances by requests serviced by those instances of the application or its components.

A service level agreement with a customer is structured in terms of an estimated range of requests for an application, with charges levied for servicing request rates within one or more different bands within this estimated range. Penalty rates are charged (in favour of the customer) when the infrastructure is unable to service requests.

Preferred implementations can improve an ASP's resource utilization by reducing the resources required for handling peak loads of multiple customers, and for guaranteeing that SLAs are not violated. Spare capacity that must be provisioned does not grow linearly with the number of customers—it remains nearly constant over many customers. Despite this, the risk of failure is limited because the probability of surges in demand from different uses coinciding (that is, occurring at the same time) is not significant, but is represented by a multiplication of already-small probabilities.

The aforementioned system maximizes an ASP's revenue through optimized resource allocation, automated system administration and need-based sharing of resources (hardware as well as software).

The described techniques conveniently allow customers to specify only their high-level requirements in terms of: the applications the customer wishes to use, and expected usage levels. The customer would leave to the ASP all decisions concerning the underlying resources. The ASP can allocate fractions of different machines to the customer, together comprising a virtual server that can increase or decrease over time, in response to fluctuating load and faults.

DESCRIPTION OF DRAWINGS

FIGS. 8A and 8B are flowcharts that schematically represent algorithm for load distribution in the system of FIG. 1.

DETAILED DESCRIPTION

Figure 1:
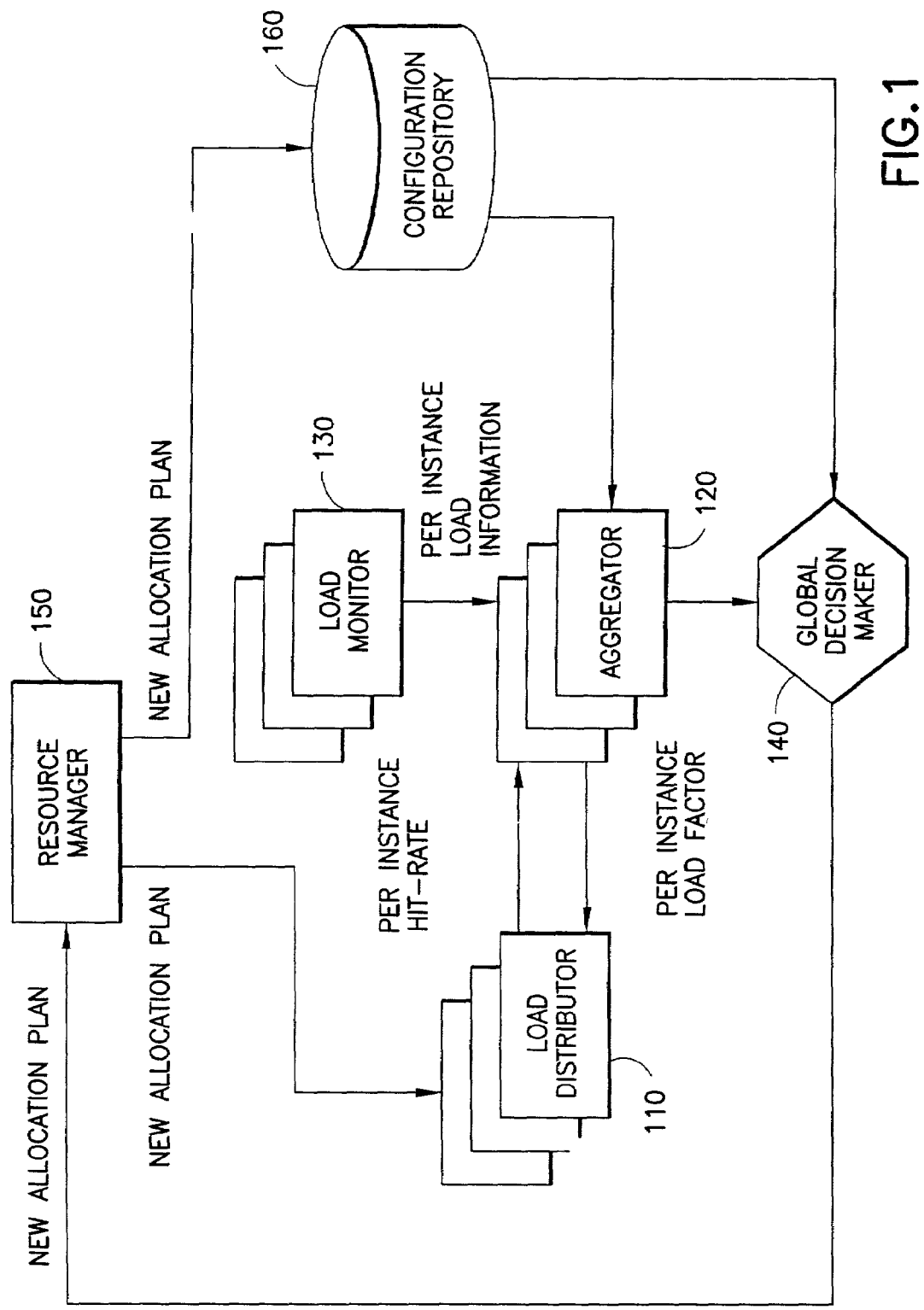
FIG. 1 is a schematic representation of the different functional components of an ASP hosting system.

Techniques and arrangements for managing server resources are described in relation to the services provided by an ASP, in which users (customers or clients of the ASP) can access one or more applications that are hosted on multiple networked machines operated by the ASP. This collection of networked machines, typically connected by a local area network (LAN) at a particular physical site, is referred to as a server farm.

Application Hosting

A server farm can be viewed as a collection of resources. These include hardware (computers, power supplies, networking machinery, etc.) as well as software that the ASP believes will be useful for its potential customers (applications, standard middleware, operating systems). The computers may be heterogeneous, and may have widely differing capabilities. For example, the ASP may provide simple personal computer servers for hosting low-volume websites as well as high-end mainframes for performing complex financial or scientific analyses.

Similarly, the software provided by the ASP may vary from simple productivity tools (word processing, spreadsheets) to full-fledged applications (payroll, e-commerce web-sites) to complex algorithms for specialized domains (interactive games such as chess, scientific computations such as weather forecasting, etc.).

Virtual Servers and Virtual Server Farms

An application can be considered as a set of resource classes. The term virtual server type is used to refer to such a set of resource classes. For example, a web-based retail store application can be composed of:

a front-end component <web server>;
a middle-tier component <e-commerce server>; and
a back-end component <database server>.

Accordingly, applications typically needed by the ASP's clients are conceptually partitioned into a set of resource classes. A resource class encapsulates the properties and functionality of a particular type of resource. As examples:

a DB2™ server is an instance of the resource class <database server>;

WebSphere™ commerce server (WCS) is an instance of the resource class <e-commerce server>, etc.

A resource class may have different instances—for example, the <database server>class can encompass Oracle and Sybase servers in addition to a DB2 server. However, these instances share the common functionality of providing remote access to shared relational databases.

A virtual server then is an instance of a virtual server type. For example, an ASP customer's web-store application may consist of an Apache™ web server, the WebSphere™ commerce server and a DB2™ database server. Note that when this application is deployed on the ASP's server farm, there may exist multiple instances of each resource class, to enable all the incoming requests to be handled in a timely fashion.

The ASP may decide to run, for example, 5 instances of the Apache™ front-end, two instances of WCS™ and one DB2™ database, given the current load on the web-store. The run-time embodiment of a virtual server therefore consists of (possibly multiple) instances of each resource class included in the virtual server type.

Thus, a client's application requirements can be converted into the specification of a virtual server type. The next step is to determine how to map the resource instances onto the physical machines available in the server farm.

In the following discussion, in the context of an ASP sharing machines amongst clients, a machine fraction is defined as a set of resources allocated to a single client, all residing on the same physical machine.

As described in further detail below, the resource instances of the virtual server may all coexist within a machine fraction, but in general, the ASP maps a virtual server onto a set of machine fractions on different machines. For example, the virtual server representing a customer's web store may be supported by running, 2 Apache™ servers and 1 WCS™ server on a fraction of one machine, 3 Apache™ servers and 1 WCS™ server on a different machine, and the DB2 server on a third machine. This allows the ASP to distribute the load on its machines. At a later time, if the load on a customers web store was very low, the ASP could reorganize the virtual server into one machine fraction containing one Apache™ and WCS™ server, and a second fraction running the DB2™ server.

One approach is to dedicate machines for particular resource classes. For example, the customer's virtual server could map to a fraction of one machine running only the front-end web servers, another machine running only the commerce server, and a third machine running a database server. This has the advantage of simplifying the ASP's maintenance chores, and reducing the interference of other applications in the monitoring and usage metering of the application to which the machine is dedicated. This approach, in which a physical machine is dedicated to a specific resource class, is the approach taken in the preferred embodiment.

An ASP's server warehouse, modelled and managed using the twin concepts of virtual servers and machine fractions, is termed a virtual server farm. The aim of the virtual server farm is to provide efficient, automated management of the ASP's resources, in which resources are allocated to customers on demand in an optimal or near-optimal fashion, while maintaining the agreed service standards specified in the customer's service-level agreements.

Service Level Agreements

An ASP's customers are desirably shielded from the technical details of the ASP's resources. It is recognised that this allows an ASP to negotiate service level agreements with customers that do not require reference to specialist technical parameters, and do not require detailed technical knowledge to understand. However, such service level agreements are still suitable to capture a customer's service requirements. A customer can merely indicate what application the customer wants hosted, and the expected demand or load on the application.

The service level agreements that can be provided in association with embodiments described herein are based upon the notion of hits on an application. A hit represents a request for use of the application. Hits typically vary in terms of their weight: the computational load the hit imposes on the application. Further, the actual resource usage may not exactly match the expected usage obtained from application benchmarking. The described embodiment can deal with small variations such as this deviation of actual behaviours from expected behaviour. Nevertheless, the hits are assumed to be well behaved; that is, their weights are bounded.

The customer specifies their requirements in terms of the rate of requests expected for the application being deployed. Different values of this hit rate may be specified for different time periods. Based upon specification of hit-rates, the customer and ASP negotiate the charges of the service level agreement. The pricing model is desirably independent of the system. The system enables support for varied pricing schemes. For instance, whatever the services provided, the ASP may charge a flat monthly rate from the customer, or the ASP may charge on the basis of the number of users using the application at different times. For consistency, it is assumed that a service level agreement includes the following parameters:

- The range of hits that the customer's application is expected to receive and support, and if possible, an average hit rate.
- The price that the customer has agreed to pay for different sub-ranges of this range.
- The penalty that the ASP pays to the customer in case its minimum requirements are not met.

A simplified service level agreement of this type requires that the customer have an idea of the amount of load that its application is going to face, rather than a detailed knowledge of the technical details of what hardware is used, how many servers are deployed, and other such detailed technical specifications. In turn, the ASP is able to transfer this functional specification of the customer's requirements into a specific set of resources that can meet the customer's demands in the service level agreement. To achieve this transfer, the ASP desirably refers to benchmarking data of the type described directly below.

Benchmarking

The capacity of a machine to support a particular application is measured in terms of the hit-rate the application can support, when executed on that machine. All hosted applications are first benchmarked to obtain information about their consumption of the machine's physical resources such as central processing unit cycles, random access memory requirements, disk space usage, etc. This process of benchmarking is performed at two levels: (a) all the end-user applications are benchmarked, (b) all the software resource classes, that constitute the building blocks of end-user applications are benchmarked individually.

This latter individual resource class benchmarking process determines the physical resources needed for a given hit rate. This information is required to decide the amount of actual physical resources to be allocated to a constituent resource class of a client's application whenever a demand is made in terms of hit-rate. The benchmarking information of end-user applications on the other hand, provides the amount of different constituent resource classes needed, for supporting a given hit rate. This information establishes a relationship between the software components of the end-user application, which denotes the ratio in which the load on the application translates into the load on these individual components.

For many popular applications, such benchmarking information is readily available from the relevant developers. If benchmarking information is not available, the ASP itself can generate it by suitable testing and experimentation. Alternatively, the application could be deployed after allocating resources based upon some liberal initial estimates of the required physical resources. The actual resource usage could be learned over an experimental period and the allocation could be adjusted accordingly by a process of trial and error.

Overview

FIG. 1 introduces the functional components of an ASP management system. These functional components are described briefly in overview directly below. These components reside on one or more networked machines controlled by the system. In FIG. 1, the flow of information between the represented functional components is indicated by the arrows between these functional components. The interaction between functional components is described below.

Resource Manager

The Resource Manager 150 along with its agents is collectively a distributed component. The agents are distributed over physical machines in the server farm. The core component—the Resource Manager 150 is a single entity located on its own machine.

Load Distributor

There is one, centralized Load Distributor 110 for each sub-farm in the virtual server farm.

Global Decision Maker (GDM)

The Global Decision Maker 140 is a single centralized entity.

Load Monitor

Load Monitors 130 are distributed across all the physical machines in the virtual server farm, as suggested by FIG. 1.

Aggregator

The Aggregator 120 has different components, as noted below.

- Level 1 Aggregator is distributed across the server farm. Each instance of this component is responsible for one or more sub-farms, or a group of customers of the farm. This implementation decision is dependent on the size of the corresponding sub-farm(s) in terms of load information generation. Each instance is located on a different machine.
- Level 2*a* Aggregator may be a distributed entity or a centralized entity depending on the load generated by the Level 1 Aggregator(s). In the distributed case, each instance handles a group of customers.
- Level 2*b* Aggregator similarly may be distributed or centralized depending on the load generated by the Level 1 Aggregator(s). In the distributed case, each instance handles a group of resource classes.

Configuration Repository

The Configuration Repository 160 is a centralized database.

System Architecture Overview

The system architecture represented in FIG. 1 is now discussed in some further detail. The ASP hosts several customers, whose users access the ASP infrastructure via the Internet. On joining the server farm, the customer signs a service level agreement, which contains the information about his requirements. This is used to initialize the customer's virtual server.

The customer's application is split into resource classes (such as tiered layers of web servers, commerce servers and database servers, as described above), each of which may have multiple instances running at any given time. The detailed information about the customer's application and layout of the various resources instances on physical machines is maintained dynamically in a Configuration Repository 160.

The high-level customer requirements are converted into per resource class requirement using the benchmarking information and application characteristics. The system has many sub-farms, each consisting of many instances of a Resource Class. The traffic to a particular sub-farm is fed through that sub-farms Load Distributor 110, which attempts to distribute the load evenly amongst the different instances under it.

Each resource instance has an associated Load Monitor 130, which is responsible for continuously collecting metrics on its performance. This information is made available to the Load Distributor 110, which uses this information to spread the load. The monitored information is also fed to the Aggregator 120, which accumulates and normalizes the metrics in some meaningful fashion. This leads to metrics on the global usage of each resource class, as well as the usage by each customer. This latter usage is compared with the permissible range set in the customer's service level agreement. Based on these numbers, the Aggregator 120 determines whether any changes are required to the current resource allocation for each customer, and suggests these to the Global Decision Maker 140.

The Global Decision Maker 140 re-computes the resource allocation to various customers with a view to optimizing certain parameters, such as generated revenue, resource utilization or perturbation of the current allocation. The new allocation is provided to the Resource Manager 150, which is responsible for actually implementing the changed allocation plan. The Resource Manager 150 also updates the Configuration Repository 160, which is the central configuration storage for the server farm, after the changes are completed.

Operational Structure of the Server Farm

The operation of a virtual server farm is now presented, with reference to the components that manage resource usage and allocation.

Load Monitors

A logical monitor I represents a time-ordered sequence of monitored data (or monitor events)—$m_{I0}\ m_{I1}\ m_{In}$. The set of logical monitors is a dynamic set. There are two kinds of monitors—hit rate monitors and machine load monitors. For each resource instance, there is exactly one monitor of each kind. The first monitor event for each monitor ($0^{th}$ event) is predefined for consistency and simplicity purposes. Such initialization is based on the initial expected load on the application. At any time, each monitor is responsible for buffering one "latest" monitor event for modules that may query the resource instance. Older monitor events can be discarded, as there is no need to maintain a permanent record of their values.

Aggregators

The Aggregator 120 involves two levels of aggregators. Level 1 aggregators collect and aggregate monitor data. For each client and resource class pair, there is one level 1 aggregator. All monitored data from instances corresponding to the resource class and the client are sent to the single aggregator. The aggregator converts this data into a hit rate per instance (trivially) and a hit weight per instance. The aggregator takes one "latest" monitor event from each monitor associated with the aggregator. Since there is always a predefined monitor event available, even if no new monitor event has been generated, the process of collecting latest monitor events is still well defined and non-blocking. There is no guarantee that all monitor events are used in this process, so in the act of aggregating, some events in a given monitor's sequence can be skipped.

In computing hit weight, the aggregator assumes that its process of collecting monitor events is fast and that all collected data is collocated in time so that the computed result is meaningful. The level-1 aggregators' output comprises of three kinds of level-1 events:

The first event is Load Factor that is fed back to the load-distributor about how much load exists for each application instance corresponding to the client.

The second event is New Hit Rate that is sent to level-2a aggregator that collects and aggregates data across all resource classes for a client, and makes demand projections for the client based on the current data got from hit-rate monitors (only) and current allocations for the client. The level-2a aggregator gets the current allocations by looking up the configuration repository.

The third event is New Hit Weight that is sent to level-2b aggregator, which calculates correction factor for each instance and aggregates them into overall correction factors (one per resource class) for the client.

In summary, for a customer, aggregation comprises looking up slices of monitor sequence data and converting the data into class-by-class weight correction factors for the client, a projected allocation demand for the client, and feedback events for the load distributors.

Load Distributor

The server farm is divided into multiple internal subfarms, in which each subfarm corresponds to a resource class of the farm. Application instances corresponding to the resource class are contained in the subfarm, and incoming load for the application instances is distributed among the instances. There is one Load Distributor 110 for each subfarm. The gateway of the server farm routes incoming hits to distributors of individual front-end subfarms based on the customer's identity. The front-end subfarms generate internal load on middle-tier and/or backend resource classes upon which the front-end components depend. The load is in terms of internal hits generated for the subfarms corresponding to the middle/backend resource classes. The internal hits are routed to the Load Distributors 110 of the internal subfarms.

The Load Distributor 110 for a subfarm functions as follows: The client of an incoming hit is identified, followed by a decision as to which subfarm application instance has enough allocated capacity allocated for the client to be able to handle the hit. This is followed by the hit being forwarded to the application. If no allocated spare capacity exists for the hit, then the hit is either dropped, or queued for delayed processing.

A Load Distributor 110 tracks the current set of instances to which the distributor distributes hits, for allocated capacities and present loads. Each Load Distributor 110 updates its information by reading the latest load information from level 1 aggregators. The load information can thus be stored in buffers of unit capacity as discussed for modules like monitors previously. The buffers can be initialized using pre-defined loads based on expected initial loads. Besides latest load information, each Load Distributor 110 needs to get the latest resource allocation information, which the Load Distributor 110 gets from the Configuration Repository 160.

Global Decision Maker

There is one global decision making process. The process is given the "latest" set of demands for all clients. For this purpose, the level-2a aggregators can maintain a unit-capacity latest demand buffer as done by monitors for their data. The buffers have to be initialized with pre-defined demands at the outset in order for there to be a valid "latest demand" at any time (as in monitors). The Global Decision Maker 140, when invoked on a set of latest demands, computes an allocation plan for the server farm. The allocation plan is made available on a unit-capacity output buffer of the Global Decision Maker 140. Unlike the unit-capacity output buffers of the monitors and aggregators, the output buffer of the Global Decision Maker 140 is not initialized with a pre-defined allocation. Thus any module depending upon the Global Decision Maker 140 has to be prepared to block in case no "latest" allocation plan is available. In the process of creating an allocation plan, the Global Decision Maker 140 uses information stored in the Configuration Repository 160.

Resource Manager

Resource Manager 150 is a single process that acts upon a latest allocation plan made by the Global Decision Maker 140. The Resource Manager 150 is responsible for the following tasks:

creating application instances as per allocation;
creating and initializing monitors;
destroying discarded application instances along with their monitors;
interfacing with any OS-level techniques for shrinking/expanding application capacities;
changing aggregators in accordance with the above changes (e.g. that the monitor sets they get data from have changed, connection changes from aggregators to the distributors and also to the Global Decision Maker 140); and
dealing with the creation/deletion of subfarms and Load Distributors 110.

The Resource Manager 150 is the bridge between the virtual world of resources, and the physical world of machines and processes. The Global Decision Maker 140 computes farm-wide resource allocation in abstract terms, assigning resource instances in terms of their request-serving capacities, to different clients. These allocation plans have to be translated into actions performed on physical machines and actual processes, to arrive at the desired configuration. The resource manager, in conjunction with its agents, performs this task.

Generally subfarms are static, since any subfarm can continue to exist as long as even one application instance is needed from that subfarm for a given client. Subfarms can get deleted and created however, depending upon addition of new clients with new resource classes, and deletion of old clients and old resource classes. The Resource Manager 150 has to ensure that all the above activities take place transparently as far as the clients and their hits are concerned. There can be no stoppage or timeouts of the server farm for the above activities. For subfarm creation and deletion, this means that the creation has to precede any hit arrivals for a subfarm and the deletion has to succeed all hit arrivals for the subfarm.

Configuration Repository

The Configuration Repository 160 acts as a central storage for the server farm. It stores the following information:

Hardware information

Software information: dependencies, hardware required, etc.

Machine Capacity Table: the benchmarking information for different resource classes (applications), in terms of k-tuple for various number of reference hits Allocation Table: the current allocation in the server farm for each client in terms of actual hits that can be served, and the hit weights for various resource class instances Application Characteristics Table: the benchmarking information for the hosted applications in terms of reference hits at the various resource classes that comprise the applications SLA information for all customers Configuration information for system components. All the system management components on initialization read this information e.g., address of the components to which it has to send the information.

In keeping with the simple sweep schedule described below, the contention/dependency between accesses to the centralized Configuration Repository 160 can be simplified using the following broad policy. Within a given set of sweeps to be scheduled (monitors followed by aggregators, followed by Global Decision Maker 140, followed by Resource Manager 150), no module writes data to the Configuration Repository 160 unless the data is not going to be used by a following module in the schedule.

In other words, the data is passed from module to module in a message-passing manner, till the last module that uses the data, and then that module writes the data into the Configuration Repository 160 if the data is going to be used at a later time. As an example, when hit weights are passed to the Global Decision Maker 140 by the aggregators, the Global Decision Maker 140 can either pass the hit weights to the Resource Manager 150 along with its allocation plan, or else the Resource Manager can write the hit weights and the plan to the Configuration Repository 160 for use by the Resource Manager 150 and a later schedule. Following the policy above, the Global Decision Maker 140 does not do any configuration repository writing, and leaves all that to the Resource Manager 150, which does all the writing based on the data passed to it.

Given the policy above, no read access to the configuration repository occurs for data for a current schedule. All read access is for data stored in a previous long schedule (or some other earlier event like initialization) for which there is no deadlock between dependencies and for which contention issues are simple (read only). This is also true for the short schedules involving monitoring, aggregation, and load distribution alone, which can execute multiple times between invocations of the Global Decision Maker 140 or Resource Manager 150.

Scheduling

One simple schedule is to have a monitoring sweep, followed by an aggregation sweep, a Global Decision Maker 140 plan computation, and then a plan deployment by the resource manager. After this the cycle repeats.

As plan computation and deployment are relatively slow processes, a cycle such as that described directly above requires a relatively large time period. Monitoring, aggregating for feeding back load information to the Load Distributors 110 may require a relatively smaller time period. To cater to this, many cycles of feedback to Load Distributors 110 can be executed per cycle involving the Global Decision maker 140. Thus the majority of events in monitor sequences can be oriented towards feedback to Load Distributors 110 with only a small minority guiding plan recomputation. A simple, optional variation of this scheme is to let the small minority guiding plan recomputation also include an average computed from the other monitor events.

Implementing a Virtual Server Farm

An implementation of individual components of a virtual server farm system is now specifically described with reference to FIG. 1. One such example of virtual servers and virtual server farm is shown in FIG. 2.

Figure 2:
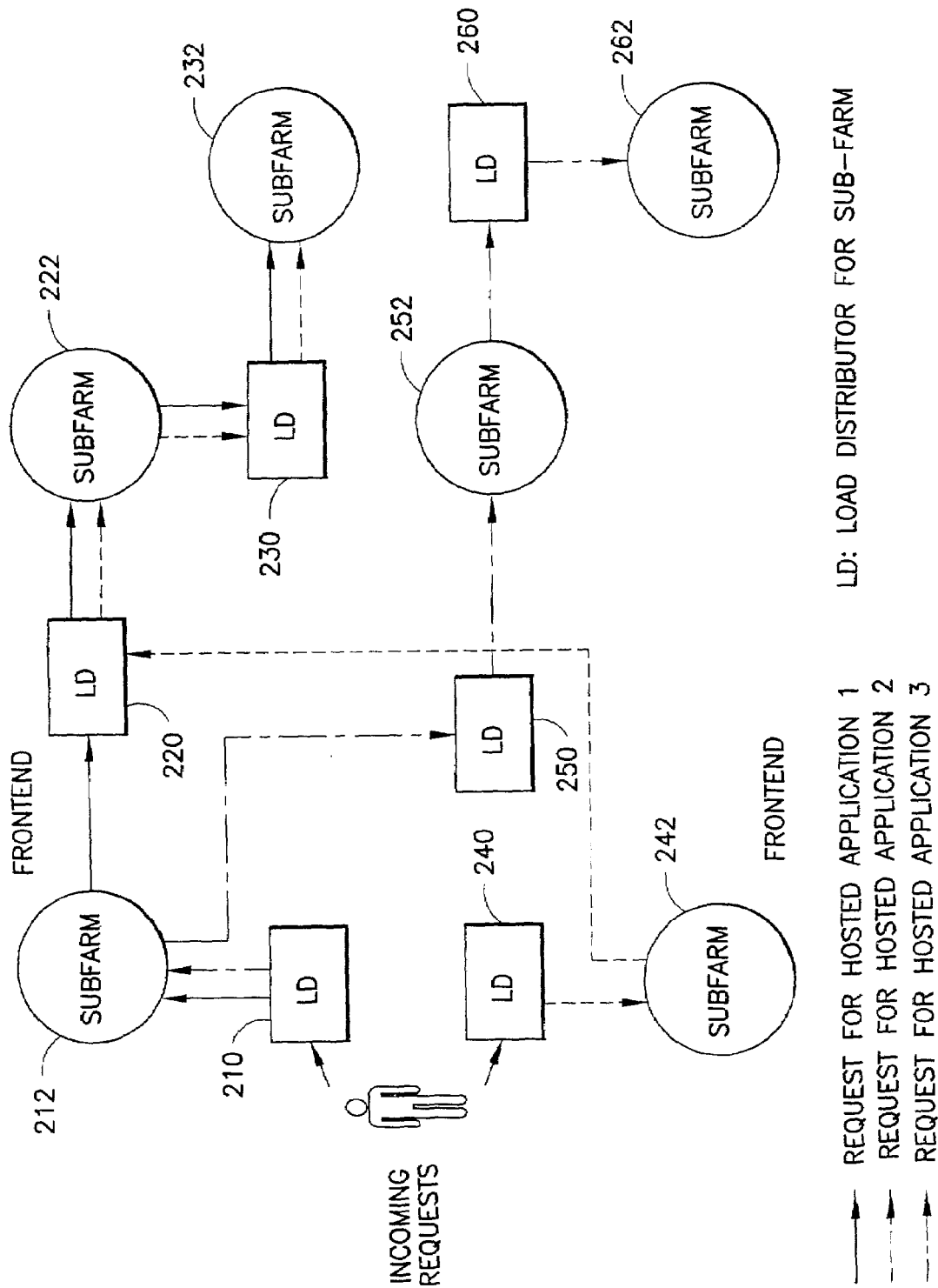
FIG. 2 is a schematic representation of the architecture of the ASP hosting system of FIG. 1.

FIG. 2 represents the architecture of an ASP hosting solution. A gateway of server farm routes the incoming hits to distributors 210 and 240 for individual front-end subfarms 212 and 242 respectively. In FIG. 2, virtual server 1 (represented by the solid lines) consists of instances of resources in subfarms 212, 222 and 232; virtual server 2 (represented by the dotted line) consists of instances of resources in subfarms 242, 222 and 232; and virtual server 3 (represented by the dashed line) consists of instances of resources in subfarms 212, 252 and 262. Hits are distributed to each of these subfarms 212, 222, 232, 242, 252, 262, by respective load distributors 210, 220, 230, 240, 250, 260, as illustrated.

Load Monitors

The Load Monitors 130 are used for monitoring resource usage by various resource class instances. This information is used to decide the changes in allocation in accordance with the service level agreement and for balancing the load across various resource class instances.

Each client has an instance of a resource class that his application requires. This instance can be mapped onto an actual implementation in the following ways:

A separate physical instance of the resource class exists for each client. Multiple such instances corresponding to a particular client may reside on multiple physical machines.

Instances corresponding to different clients may reside on the same physical machine.

A single physical resource instance serves multiple clients. The usage of the resource by each client is restricted either by the instance itself or by an external entity.

Logically, a Load Monitor 130 exists for each instance of a resource class for a client. However, in the actual system a single load monitor per physical machine can monitor and report the load information for all application instances on that machine.

There are two types of monitors:

A hit-rate monitor which measures the number of hits per unit time for each application instance.

A machine load monitor which measures the actual physical resources consumed by the application instance. This could be a vector of k dimensions consisting of parameters such as central processing unit cycles, required memory capacity, etc.

The Load Distributor 110 measures the hit rate for each application instance of a client by aggregating the number of hits forwarded to it. The Load Distributor 110 thus also acts as a load monitor.

The machine load monitor can be implemented using any of the following techniques:

By using some existing system programs which provides the load information such as ps or top in UNIX.

By using information provided by the underlying operating system like/proc file system in UNIX.

Any existing load monitoring technologies like Tivoli™ load monitoring system.

Load information provided by the application, if any.

The Load Monitors 130 maintain the latest load information in a unit buffer that is picked up by Level 1 aggregator.

The load information can also be used to charge the client depending on the resource usage. Moreover, valuable information can be obtained by monitoring the load generated by a set of requests arriving during a period of time. Such information can be gathered for fine-tuning of the system and for designing better policies.

A load distributor LD-n interacts with the following components of the VSF system to carry out all its tasks listed above.

Level 1 Load Aggregator

LD-n sends $S_{jk}$ to the level 1 load aggregator and receives $L_{jk}$ and availability status of the instance for each client from it.

Resource Manager

LD-n receives messages from the Resource Manager 150 regarding:

Shutdown of an existing instance

Creation of an instance and the allocated capacities for clients thereon.

Change in the allocated capacity for clients in an instance.

A "switch plan" message to change to the new allocations.

Let LD-n be the load distributor for the subfarm of resource class i. Let t be the timer whose value is between zero and $T_u$. t is incremented based on the system clock. The timer is local to a load distributor. At start-up and during subfarm creation, $L_{jk}$ and $S_{jk}$ on each of the instances for all clients are assumed to be zero. $H_{jk}$ of each instance j per client k is initialized to the value received from the resource manager. Initialize t to zero. LD-n starts forwarding incoming requests based on the allocation $H_{jk}$ of each of the instances per client as informed by the Resource Manager 150.

Aggregator

The Aggregator 120 collects load information from the monitoring agents and aggregates at various levels for efficient decision-making.

Figure 3:
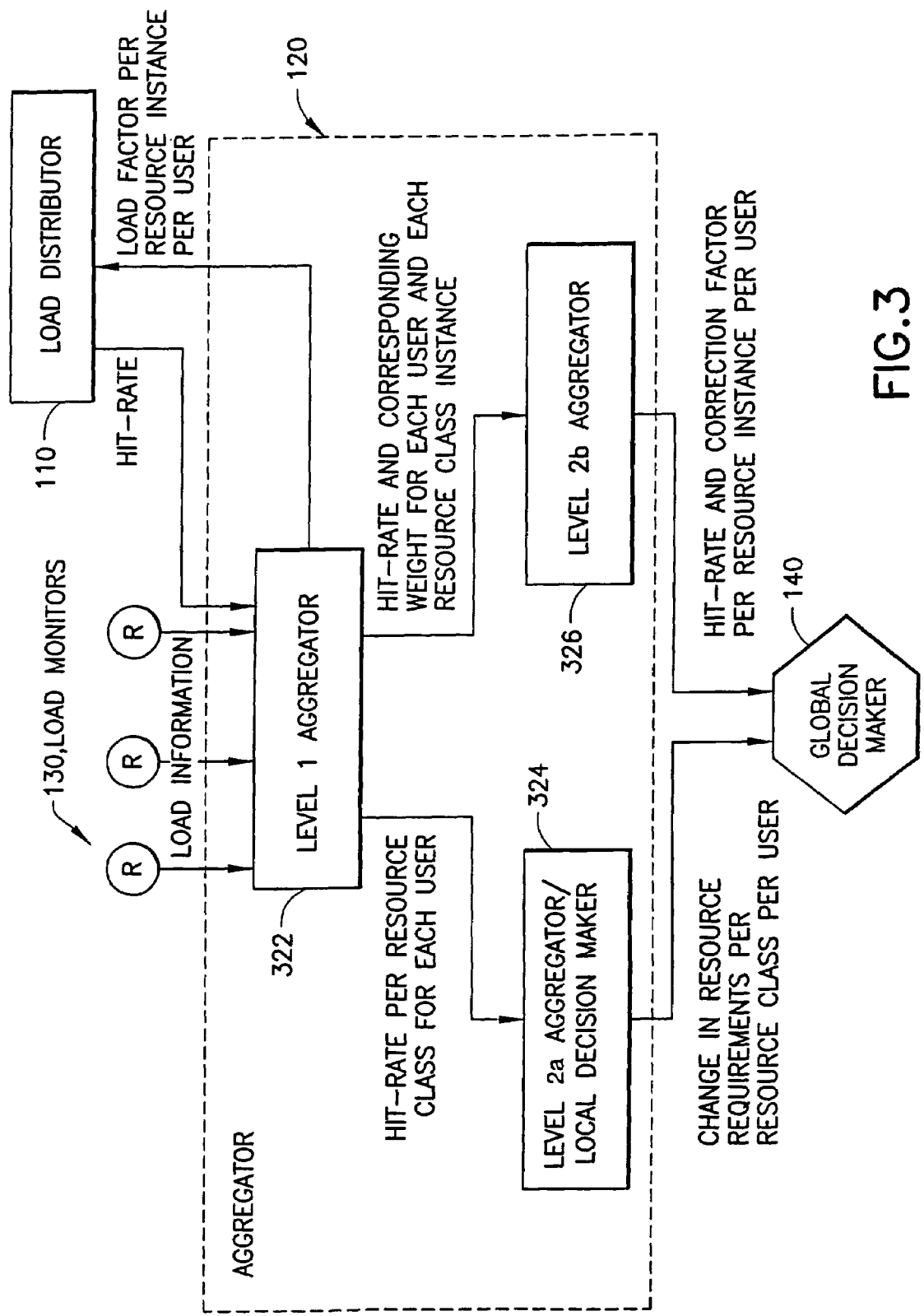
FIG. 3 is a schematic representation of how aggregated data flows are handled in the system of FIG. 1, prior to processing by a global decision maker component.

FIG. 3 schematically represents the way in which aggregated data flows are handled. With reference to FIG. 3, the Aggregator 120 consists of the following sub-components.

Level 1 Aggregator 322: receives the load information (current incoming hit rate for each application instance and the resource usage k-tuple indicating the current consumption of resources by each application instance) from the Load Monitors 130 (R1, R2, R3) and aggregates the information on per user per resource class basis. The Aggregator 120 computes the following parameters using the equations given below.

New Hit Rate: the aggregate hit rate on per user per resource class basis obtained by adding the hit rate for each instance of a particular resource class for a particular user. The Level 1 Aggregator 322 sends this information to Level 2a Aggregator 324.

New Hit Weight: the weight of a hit for each resource class instance. The Level 1 Aggregator 322 sends this information along with the corresponding hit rate to Level 2b Aggregator 326.

Load Factor: the fraction of the allocated resources consumed for each resource class instance. This information is sent to the Load Distributor 110.

Weight of a hit=max. ($\forall_i$(resource usage$_i$ for actual number of hits served)/(resource usage$_i$ for a reference hit*actual number of hits served))

where i=k-tuple consisting of CPU, memory, etc.

Load Factor=(number of hits served*weight of current hit)/(actual hits allocated*weight of hit allocated)

The resource usage (k-tuple consisting of CPU, memory, etc as mentioned earlier) by the reference hit for a particular resource on a machine is obtained from the benchmarking information in the Configuration Repository 160. In addition to this, the number of hits allocated for each resource instance and their allocated weight is also read from the Configuration Repository 160.

Level 2 Aggregators 324, 326: receive the aggregated load information from the Level 1 Aggregator 322 and compute the changes in resource requirements for each resource class of the users and send them as demands to the Global Decision Maker 140. The changes are demanded if the new resource requirement is different from the current allocation and conform to the client's SLAs. These demands of a user are sent in terms of number of reference hits (to be increased or decreased).

As mentioned earlier, the demands are sent for each client and for each resource class that constitutes that client's application. These demands consist of two types of requests. One type of demand arises whenever there is a variation in the incoming hit rate on a resource class and the system needs to adjust its resource allocation to respond to this variation. These demands are identified, verified and generated by the Level 2a Aggregator 324. The Level 2a Aggregator 324 is referred to in FIG. 3 as a local decision maker, in contrast to the Global Decision Maker 140.

The second type of demand (called correction factor) needs to be generated whenever the weight of incoming hits is different from the reference hits and the resource allocation needs to be corrected to incorporate the change. These demands are identified and generated by the Level 2b Aggregator 326.

Level 2a Aggregator 324: receives the portion of load information that indicates the current hit rate of the client on each resource class. Based upon this information and the current resource allocation information (obtained from Configuration Repository 160), the Aggregator 120 computes the changes required in the allocation (possibly null) for the client.

Figure 4:
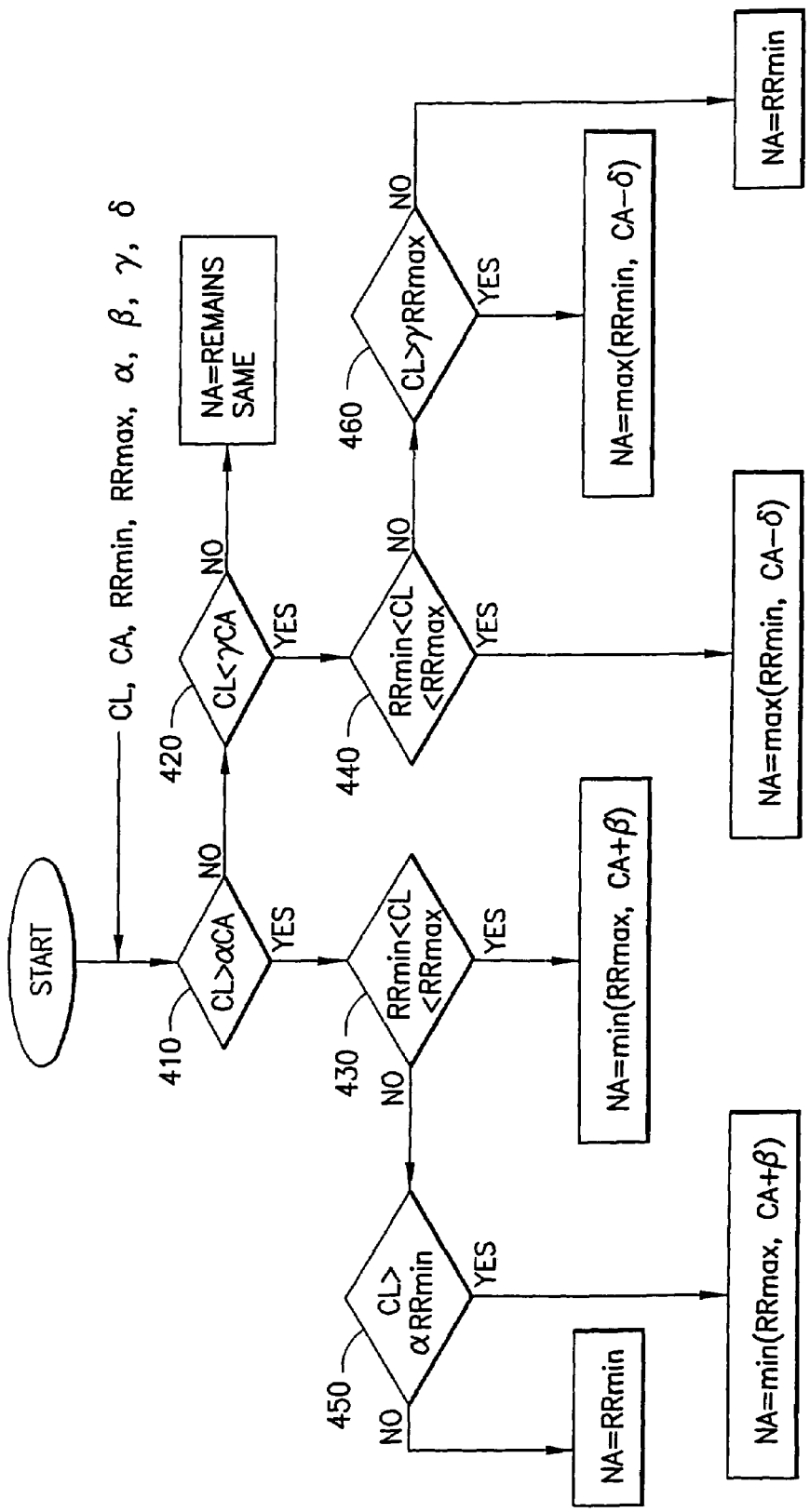
FIG. 4 is a flowchart which schematically represents an algorithm for a level 2a aggregator in the system of FIG. 1.

FIG. 4 is a flowchart of the algorithm used to compute the new resource demands. It uses four configuration parameters ($\alpha$, $\beta$, $\gamma$ and $\delta$) which can be different for different clients. The parameter $\alpha$ denotes the overload trigger i.e., whenever the load of a client reaches within a factor $\alpha$ of its current allocation, an amount of increase denoted by $\beta$, is demanded for that client. Parameters $\gamma$ and $\delta$ are the corresponding underload parameters. These parameters $\alpha$, $\beta$, $\gamma$ and $\delta$ are either constants or functions of current load, current allocation and SLA limits, in which case they may be tuned to improve the system performance. However, after computing $\beta$ the aggregator verifies that the demanded increase in allocation conforms to the SLA of the client and only then sends the demand to the Global Decision Maker 140.

Similarly, if the change is negative, i.e. the allocation is to be reduced, the aggregator needs to check that the reduction does not cross the minimum resource allocation level as per the SLA.

The operation of the algorithm of FIG. 4, as outlined above, is straightforward. In step 410, the current load is compared with the current allocation, multiplied by parameter $\alpha$. If the current load is less, it is then checked whether the current load is less than the current allocation multiplied by parameter $\gamma$ in step 420. In either case, if the current load is greater or less respectively, it is then checked whether the current load is between the minimum and maximum resource requirements in steps 430 and 440 respectively.

If the current load is greater than the current allocation multiplied by $\alpha$, and outside of this resource requirement range, it is checked in step 450 whether the current load is greater than the minimum resource requirement multiplied by the same parameter $\alpha$. If so, a new allocation is determined as the lesser of the maximum resource allocation and the current allocation plus parameter $\beta$. If the current load is within the resource requirement range in step 430, the new allocation is also determined as the lesser of the maximum resource allocation and the current allocation plus parameter $\beta$.

Similarly, if the current load is less than the current allocation multiplied by $\gamma$, and outside of the resource requirement range, it is checked in step 460 whether the current load is greater than the maximum resource requirement multiplied by the same parameter $\gamma$. If so, a new allocation is determined as the greater of the minimum resource allocation and the current allocation less parameter $\delta$. If the current load is within the resource requirement range in step 440, the new allocation is also determined as the greater of the minimum resource allocation and the current allocation less parameter $\delta$.

If, instead, it is found in steps 450 or 460 that: (i) the current allocation is greater than the minimum resource allocation multiplied by parameter $\alpha$, (in step 450) or (ii) the current allocation is greater than the maximum resource requirement multiplied by parameter $\delta$ (in step 460), the new allocation is simply the minimum resource requirement.

Moreover, if the change in requirements corresponds to a resource class that acts as a front end for the client's application, then this demand is an application level demand and treated differently. In other words, such a request gets translated into a compound request consisting of appropriate number of hits for all the resource classes of the client's application. To compute the corresponding hit demand for the underlying resource classes, the aggregator computes the current correspondence ratio of resource classes of that application, for that client.

The correspondence ratio of an application, specifies the number of reference hits generated at the underlying resource classes for each hit arriving at the front-end resource class of that application. This information can be computed by obtaining the current hit rate of that client for each resource class, and comparing the values. At system initialization, this ratio is obtained from the benchmarking information and stored in the configuration repository. If there is a significant change in the newly computed ratio then the old value in the configuration repository is overwritten by the new one. Once the configuration ratio is obtained, the aggregator then uses the ratio to generate appropriate resource demands for all the resource classes of that application.

Level 2b Aggregator 326: computes the correction factor in terms of reference hits for each resource class instance for each client. The Level 2b Aggregator 326 receives the current hit rate along with the corresponding weight for each resource class instance from level 1 aggregator. The Aggregator 120 obtains the previous hit-weight from the Configuration Repository 160 and then computes the correction factor using the equation given below.

Correction Factor=(new hit weight−previous hit weight)*number of reference hits allocated It also computes the total change in demand by aggregating these correction factors across all instances of each resource class for each client. These demands are then forwarded to the Global Decision Maker 140 along with current allocation, current hit-weight and the correction factor for each resource class instance.

Load Distributor

The Load Distributor 110 maps requests routed to it according to the requests' client identities to the appropriate application instances. Requests generated by instances in a subfarm are routed to one of the next-level subfarms by the next-level load distributor.

Figure 5:
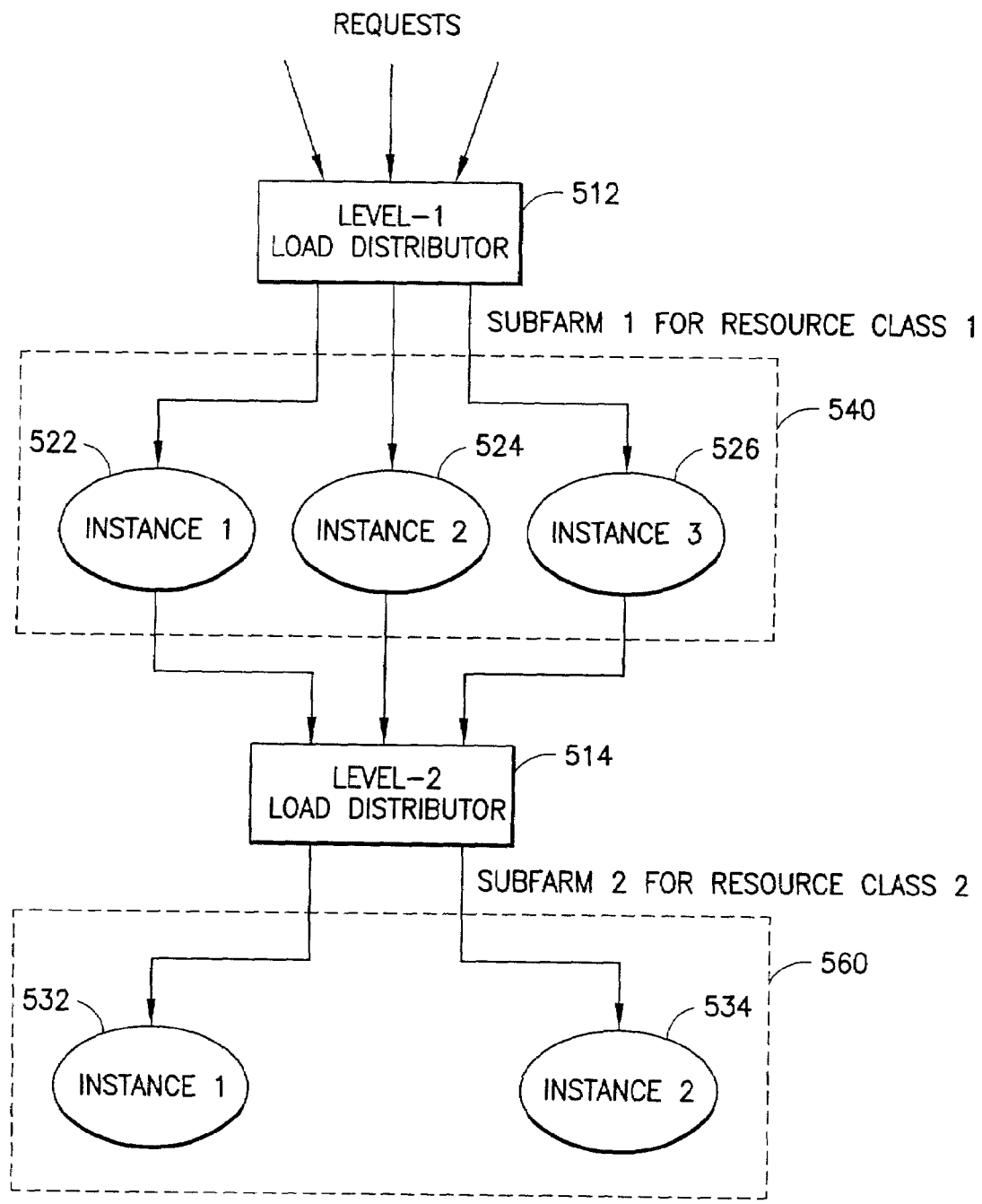
FIG. 5 is a schematic representation of how incoming requests are distributed in the system of FIG. 1.

FIG. 5 schematically represents how incoming requests are distributed. As shown in FIG. 5, a incoming requests are received at a Level-1 Load Distributor 512. These requests are distributed by the Level-1 Load Distributor 512 to Subfarm 1 for Resource Class 1 540 that hosts, for example, Instances 1, 2 and 3 (522, 524 and 526). After processing by the Subfarm 1 for Resource Class 1 540, requests are passed to the Level-2 Load Distributor 2 514. These requests are in turn distributed by the Level-2 Load Distributor 514 to Subfarm 1 for Resource Class 1 560 that hosts, for example, Instances 1 and 2 (532, 534).

Figure 6:
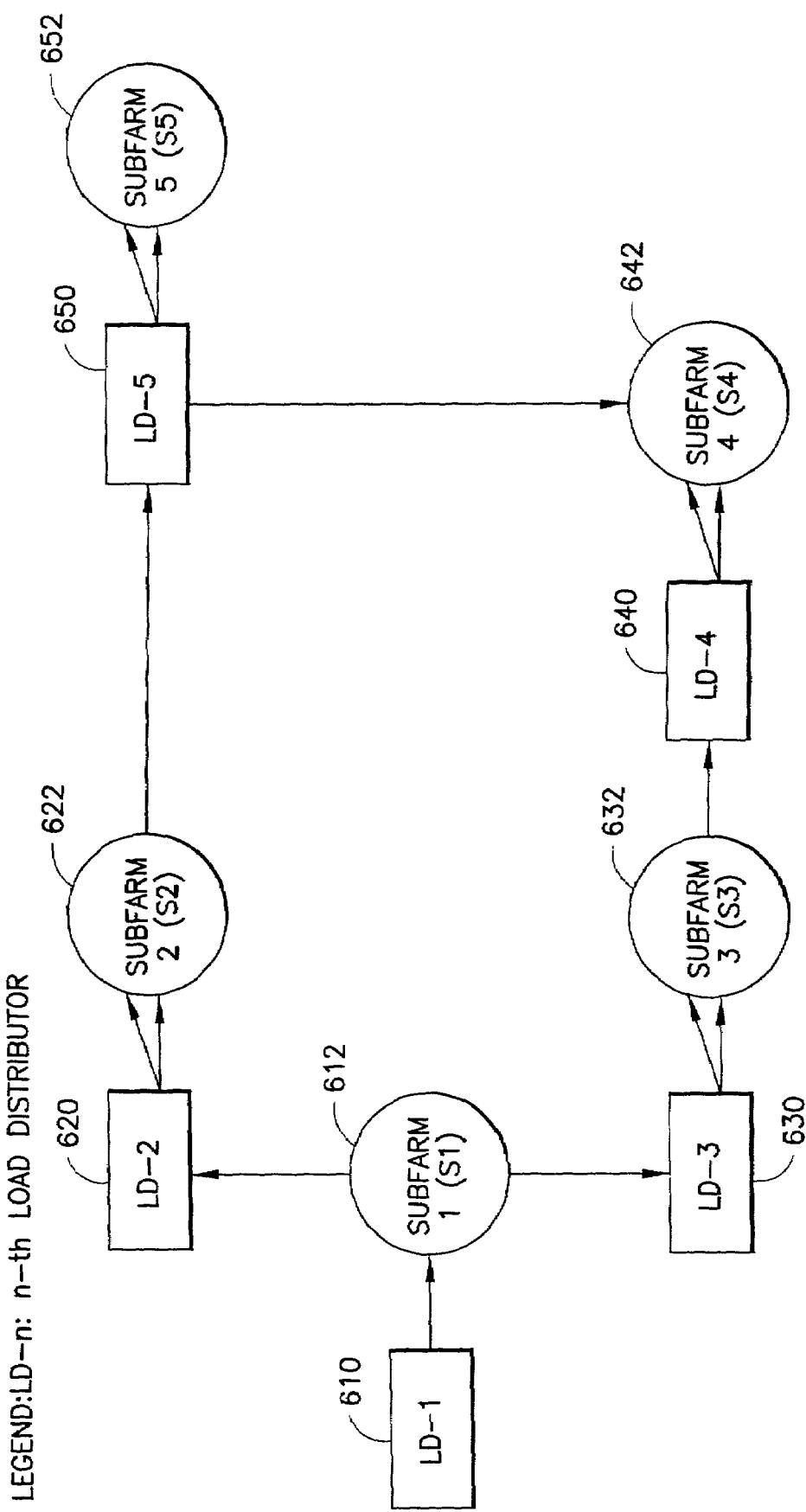
FIG. 6 is a schematic representation of load distribution for different virtual portions of the system of FIG. 1.

FIG. 6 schematically represents the flow of incoming requests. In FIG. 6, let a request R belonging to client C be received by the LD-1 610. The request R is forwarded to the least-loaded instance I belonging to client C in subfarm S1 612. After processing the request R, the instance I may generate internal request(s) for the next-tier resource. The instances of the next-tier resource are a part of subfarm S2 622. Such requests are forwarded by LD-2 620 (that is, the next-level distributor of LD-1 610) to the least loaded instance of the tier-2 resource for client C in subfarm S2 622. As illustrated in FIG. 6, requests are passed on in this way to other load distributors LD-4 640 and LD-5 650 to least-loaded instances belonging to client C in respective subfarms S4 642 and S5 652.

A Load Distributor 110 has a unit time interval $T_u$, with respect to which it computes the hit rate. It has a FIFO queue for incoming requests. Each load distributor also has two 2-dimensional tables—each row corresponds to a resource instance in its subfarm and each column corresponds to a client. One of the tables is static with respect to the resource allocation by the Global Decision Maker 140 and is called RAT (Resource Allocation Table). The other table is dynamic and is named as RCT (Resource Consumption Table). The entry in the RAT is $H_{jk}$—the allocated hits to be served by the $j^{th}$ instance for the client k during the time interval $T_u$. The entry in the RCT is $(S_{jk}, L_{jk})$. $S_{jk}$ is the number of hits sent to the $j^{th}$ instance for the client k during the current time interval $T_u$. $L_{jk}$ is the load information (load factor) of the $j^{th}$ instance for the client k during the current time interval $T_u$.

The tasks that are performed by a load distributor LD-n to distribute hits among instances in a best-effort manner are described below.

For each request received it finds the least loaded instance m and forwards the hit to it.

Keeps track of the number of the hits forwarded to an instance per client in the current time interval and sends this information to the Level 1 aggregator.

Removes faulty instances from the RAT and RCT.

Updates the allocated capacity for an instance upon a new resource allocation plan being implemented by the resource manager and starts forwarding requests according to the new allocation.

Stops forwarding requests to an instance that has been shut down and starts forwarding requests to newly created instances.

If the request FIFO queue is non-empty, then process (forward/drop) the request at the head of the queue.

Global Decision Maker

The Global Decision Maker 140 is that component of the system which takes the current system state along with client SLAs as input and generates the new resource allocation plan as its output. The Global Decision Maker 140 receives the following information as input:

Resource demands, in terms of reference hits, from unit output buffer maintained by the Level 2a Aggregators 324. In case the demand for a <resource class, client>tuple is null in this cycle, the output buffer contains the old value (a flag indicates this staleness) and is ignored.

Correction factor demands, in terms of reference hits, from the unit output buffer maintained by the Level 2b Aggregators 326. As above, the input is ignored if the input belongs to a previous cycle.

Correspondence ratio: At system initialization, the client benchmarking information defines the correspondence ratio wherever there is interdependence between resource classes used by a client. This ratio is used in allocating resources. This is important because if an application cannot be granted its demands for a particular resource class then it is meaningless to reserve corresponding resources for the other resource classes of that application. The ratio may vary significantly over time. Its value is updated by the aggregators and stored in the configuration repository. The Global Decision Maker 140 reads this value from the Configuration Repository 160.

Other client-specific application information (obtained from the Configuration Repository 160):

Minimum and maximum amounts of each resource class to be allocated (derived from SLAs, could be zero).

The maximum number of instances allowed in a resource class for a client.

A number indicating the cost of starting a new instance or shutting down an existing instance (could be positive, zero or negative) of a resource class.

A number indicating the cost of migrating a resource instance from one machine to another.

Infrastructure information (obtained from Configuration Repository 160):

An abstract identification (names) of machines available to each resource class and out of those, the machines available for each client.

The capacity of each machine with respect to a resource class. This is computed after accounting for O/S overheads, application overheads and leaving a pre-defined extra capacity to handle small momentary fluctuations in load.

Limits (if any) on the number of instances allowed on each of those machines.

Existing allocations of each client, on the machines in the farm, specified in terms of rate of actual hits. Along with these the hit-weights are also supplied. The product of the two gives the allocation in terms of reference hits.

Charging information from the clients' SLAs. This includes the penalty to be paid in various situations of non-conformance to SLA.

Faults if any in the system result in reduction in the capacity of the machine (may be to zero). Global Decision Maker 140 assumes that the reduction in available capacity has been reflected in the Configuration Repository 160 owing to such faults.

A GDM solver algorithm decides allocations of load to machines in response to the above demands. The cost of hosting is minimized using a mixed integer linear programming model of the system. A linear model is described, followed by a solution method for this model.

Linear Programming Model

The aim of the model (using linear programming) is to match the supply of machines to client demands in various resource classes. Assuming machines of multiple types, and clients paying differing amounts, the model is the transportation problem (in the area of linear programming), where supply and demand are matched so as to maximize the revenues. The major additional complication is the requirement for each machine to be assigned to a single resource class.

At most the capacity demanded is supplied (see equation (2)) since any extra allocation would go waste. Also, in case the system does not have sufficient capacity, this allows dropping of part of the demand due to clients with least priority.

The supply constraint (see equation (3,4) below) is modified to two constraints. One constraint assigns a single resource class to each machine. The other allows only demand in that resource class to be allotted to it.

Limits are modelled on the number of clients that can exist on a single machine, and the number of machines that a single client's requirements in a single resource class are spread over. The first is to limit the overheads arising out of supporting a large number of clients on a single machine. The second is because it is harder to manage multiple instances as the number of machines over which a client is spread increases. (See equations (5,6).)

The next constraint ensures that where requirements for resources from different resource classes are dependent on each other (e.g., where one resource class calls another), the amounts allocated are in proportion (see equation (7)). Although a linear model is not an accurate one, the linear model represents an approximation of the actual dependence between the two resources.

On examination of the model, it is obvious that this problem will always have a feasible solution as long as there are sufficient resources to satisfy the minimum demands of all the clients. To satisfy equation (7), allocations to related resource classes would be decreased according to available capacity of the bottleneck resource class.

Finally, a constraint that each client's minimum requirement according to the SLA promised to it is always met (equation (8)). The supply of machines at any time is enough to ensure feasibility of this constraint; however, in cases such as a major system fault, this may not hold. The minimum requirements must also be in the correspondence ratio.

A feasible allocation is determined for the above model, while optimizing on the following cost model.

Firstly, clients are charged per unit of resource used (the units are reference hits) that depends on their SLA, the machines they use, and the resource classes they utilize. The charge also depends on the 'range' of usage that the client falls into at that time. For example, if the charging units are total number of hits in the billing cycle, then the first A units may be charged at a lower rate than the next A units and so on (see equation (1) below, first term). Also, the charge can be weighted according to the hit-weight of the reference hits, to reflect the actual amount that the client will pay for the hit.

Secondly, there are system costs of adding (set up cost) or removing a client ('cleaning' cost) from a machine (see equation (1), second term).

Thirdly, the more the number of instances of a client on a resource class, the more expensive it is for the system to manage data consistency (see equation (1), third term).

Finally, there is a penalty if the system cannot handle the client's minimum requirements for any reason, such as a system failure. The penalty is added on to the model only when resources are insufficient to satisfy the minimum demands of all the clients, in which case, this constraint (equation (8)) is dropped and the model solved again without it, and with the penalties instead. There is a standard model to incorporate penalties in linear programming, which is being omitted for ease of presentation (see, for example, [12]).

The detailed model description requires the use of some notation. The letters below may indicate either variables (values of which are to be solved for) or inputs into the GDM solver (data about the system). The subscripts i, j, k take all integer values from 1 to $N_i$, $N_j$, $N_k$, respectively, where $N_i$ is the total number of clients on the system, $N_j$ is the total number of resource classes, and $N_k$ is the total number of machines.

For clarity, the following represent inputs:
$A_{ijk}$—current allocation
$C_{jj'}$—correspondence ratio
$D_{ij}$—demand
$L_{jk}$—max. number of clients on a machine
$M_{ij}$—max. number of machines on which a client lives
$Min_{ij}$—demand
$N_i$—number of clients
$N_j$—number of resource classes
$N_k$—number of machines
$P_{ijk}$—prices charged
$S_{jk}$—machine capacity for resource classes
$T_{ijk}$—penalty for adding or removing instances
$U_{ij}$—penalty for number of instances
$V_{jk}$—hit-weight demand
$Y_{ijk}$—current instances on machines And the following represent variables:
$B_{ijk}$—allocation to client
$Z_{ijk}$—allocation of instance on machine
$R_{jk}$—allocation of machine to resource class Let $D_{ij}$ denote the total demand by client i for resource class j. $D_{ij}$ is the sum of demands from aggregators 2a and 2b in reference hit units, truncated according to any maximum allowed loads for specific clients. $D_{ij}$ may be negative if it is a request for reducing allocation of resources. From the configuration repository it obtains $A_{ijk}$, the current allocations, in terms of reference hits, for client i on resource class j, machine k. It solves for the final allocations $B_{ijk}$.

Let $P_{ijk}$ denote the sum charged per unit of resource $B_{ijk}$ allotted to a client i, resource class j and machine k combination. These system costs of adding or removing a client are together charged at the rate of $T_{ijk}$ for each such change. Let $U_{ij}$ denote the system costs of maintaining coherence between these instances.

$$\text{Maximize } \Sigma_i \Sigma_j \Sigma_k (P_{ij} * B_{ijk}) - \Sigma_i \Sigma_j \Sigma_k T_{ijk} * |Y_{ijk} - Z_{ijk}| - \Sigma_i \Sigma_j (U_{ij} * \Sigma_k Z_{ijk}). \quad (1)$$

Here $Y_{ijk}$ in $\{0,1\}$ indicates if $A_{ijk} > 0$, and $Z_{ijk}$ in $\{0,1\}$ indicates if $B_{ijk} > 0$. Let $S_{jk}$ denote the capacity of machine k for resource class j, i.e., the number of reference hits of resource class j that the machine can support. Then the following equations, of which only the second is a constraint, are obtained:

$$Y_{ijk} <= A_{ijk}/S_{jk}, \ Z_{ijk} >= B_{ijk}/S_{jk}. \quad (1)$$

The demand constraint is:

$$\Sigma_k B_{ijk} <= \Sigma_k A_{ijk} + D_{ij}, \text{ for all } i, j. \quad (2)$$

Each machine k can be allocated no more than its capacity for the jth resource class, $S_{jk}$. The variable $R_{jk}$ in $\{0,1\}$ indicates if resource class j exists on machine k.

$$\Sigma_i B_{ijk} <= S_{jk} * R_{jk}, \text{ for all } j, k. \quad (3)$$

Only one resource class is allowed to exist on one machine.

$$\Sigma_j R_{jk} <= 1, \text{ for all } k. \quad (4)$$

There is a limit $L_{jk}$ on the number of instances on each machine.

$$\Sigma_i Z_{ijk} <= L_{jk}, \text{ for all } j, k. \quad (5)$$

There is another limit $M_{ij}$ on the number of instances for each client on a given resource class.

$$\Sigma_k Z_{ijk} <= M_{ij}, \text{ for all } i, j. \quad (6)$$

Let $C_{jj'}$ denote the correspondence ratio (defined earlier as the ratio of usage of resource class j', to the usage of the resource class j). To ensure that the allocations correspond to the correspondence ratios $C_{jj'}$, such that:

$$\Sigma_k B_{ij'k} = C_{jj'} * \Sigma_k B_{ijk} \text{ for all dependencies } j, j'. \quad (7)$$

Each client must be allocated a minimum.

$$\Sigma_k B_{ijk} >= \text{Min}_{ij}, \text{ for all } i, j. \quad (8)$$

In addition to the above constraints the following simplifications can be made to reduce the number of variables. Some client-resource combinations live only on a specific set of machines. The corresponding $B_{ijk'}$ are removed for all k' machines not in the above set. Also, for all machines k' which are assigned to one particular resource class, the corresponding $R_{jk}$'s are set to 1, and other $R_{jk}$'s, such that k not equal to k,' are set to 0.

The above problem is first solved for the following minimum in equation (8).

$$\text{Min}_{ij} = \text{maximum(minimum specified by the } SLA, (\Sigma_k A_{ijk} + \Sigma_k V_{ijk})),$$

where $(\Sigma_k A_{ijk} + \Sigma_k V_{ijk})$ represents the sum of the current allocation and its corresponding hit-weight demand $V_{ijk}$ which is also specified in terms of reference hits. This option supports a higher quality service to all clients since existing allocations in the system would be upheld. In case this is not feasible, it is replaced by the original equation (8). If that is infeasible, the constraint is replaced by the penalty for not satisfying the minimum resource requirement, as mentioned earlier.

The above problem is in general difficult to solve in an exact manner. However, there are standard linear programming techniques, problem linear programming relaxation, cutting planes, branch-and-bound, and column generation techniques, that can generate approximate solutions to the above efficiently. A simple heuristic is to generate a solution through linear programming relaxation, then re-solve the simplified problem after setting the integral variables to rounded off (but feasible) values. The addition of a preprocessing module can eliminate variables, constraints so as to speed up the solution. The solution process is halted after a short time for the best solution obtained till then.

Once the new allocation plan is obtained, the resource manager is instructed to execute the new allocation. The information that the Global Decision Maker 140 passes to the Resource Manager 150 consists of the client-wise list of resource allocations on the machines in the virtual server farm along with the prevailing hit-weights on those machines. These allocations are specified in terms of reference hits. For successful executions, the Resource Manager 150 updates the Configuration Repository 160 with new values of allocation, in terms of actual hits that can be served (obtained by dividing the allocation in terms of reference hits by the corresponding hit weight). The values of hit weights are also updated.

The Resource Manager

A resource manager agent (RM Agent) is installed on each machine in the server farm, as a program that is started automatically when the machine boots up. The RM Agent provides an interface that can only be used by the Resource Manager 150, for managing resource instances on that machine. For each type of resource available in the farm, the appropriate set of low-level startup and shutdown commands are registered in the farm's Configuration Repository 160. Since each machine in a sub-farm only hosts one type of resource, the RM Agent only needs to learn one set of startup and shutdown commands. Knowing the type of resource hosted on its machine, the RM Agent acquires the appropriate commands by querying the Configuration Repository 160. Once this is done, the agent registers its location in the Configuration Repository 160 to enable the Resource Manager 150 to communicate with it when necessary.

A machine in a sub-farm may host multiple instances of a resource. Each instance is given an identifier (instanceID) that is unique on that machine. This can be implemented by merely using the operating system's process identifier (pid) as the instance ID. Each instance may support hits from multiple clients, and each client may be allocated a different maximal hit rate on that instance. The RM Agent for the machine therefore maintains a table for each instance, containing these hit-rate allocations per client. The agent presents the following abstract interface to the RM:

startup( ) returns instanceID

This startup( ) command requests the agent to start an instance of the resource on its machine, and assign an ID to it.

shutdown(instanceID)

This shutdown( ) command requests the agent to shut down the specified resource instance.

setAllocation(instanceID, clientName, hitRate)

This setAllocation( ) command sets the client's resource allocation for the specified instance in terms of a hit-rate.

When any of these operations is requested, the agent attempts to execute it and then reports its success or failure to the Resource Manager 150. The implementation of each of these operations is explained in detail below.

The Resource Manager 150 is the central entity that orchestrates the actions of its agents, as well as other components of the virtual server farm, in order to implement the allocation plan prepared by the Global Decision Maker 140. It maintains two copies of the allocation—a current plan reflecting the current status of the farm, and the new plan provided by the Global Decision Maker 140. At farm startup time, the current plan is initialized to indicate that no resources are allocated to any client. The Resource Manager 150 starts by inspecting the output buffer of the Global Decision Maker 140, to determine whether a fresh allocation plan has been generated. If not, it merely waits until such a plan is available.

The Global Decision Maker's 140 allocation plan is defined in the form of a three-dimensional table. For each client, the plan lists the updated allocations for each instance of every resource class that it requires. The allocations are expressed as usual, in terms of a hit-rate. When the Global Decision Maker 140 is done with generating the new plan, it invokes the Resource Manager 150 and supplies the plan to be implemented, as a parameter. The Resource Manager 150 then scans through the three-dimensional plan table along the resource instance axis. For each resource instance, it compares the current allocation for each client with the new allocation. Several cases are possible:

I. current and new are equal
I. current=0 and new is non-zero
I. current is nonzero and new=0
I. current and new are nonzero and current is not equal to new Case I No action needs to be taken by the Resource Manager 150.

Case II

A new resource instance may have to be created if it doesn't already exist, i.e. if all other clients of that instance are also currently at zero allocation. The Resource Manager 150 invokes the startup( ) operation on an RM agent. It locates the appropriate agent by looking up its address in the Configuration Repository 160. The agent responds by using the resource's startup script to create the instance. Each instance must have an associated monitor. Therefore, the RM agent either creates a new monitor, or assigns the responsibility of monitoring the new instance to an existing monitor on that machine. Once it completes these tasks successfully, it sends an acknowledgment message to the Resource Manager 150, which then uses the agent's setAllocation operation to initialize the client's hit-rate allocation to the new value. The RM agent then sends a message to the Load Distributor 110 of its sub-farm, informing it about the creation of the new instance, so that incoming requests can be served by it.

Case III

The resource instance may have to be destroyed if it is no longer needed, i.e. if all other clients of that instance are also reduced to zero allocation. The Resource Manager 150 then invokes the shutdown operation on the appropriate RM agent, supplying the instance ID. The agent first informs the sub-farm's Load Distributor 110 that the resource instance is no longer available, so that no subsequent hits are routed to that instance. The agent then uses the resource's shutdown script to destroy the instance, disables the associated monitor, and deletes its own internal data table pertaining to that instance. The shutdown script, which is provided by the resource class, need not destroy the instance immediately. The instance can proceed to service any requests that have already been received, but refuse any further incoming requests. Once the pending requests have been attended to, the instance can then shut itself down cleanly.

Case IV

The allocation of the resource instance needs to be modified. The Resource Manager 150 uses the setAllocation operation on the RM agent to achieve this. The agent updates its internal tables to indicate the new maximal hit-rate. It also needs to enforce this allocation. For this purpose, it sends a message to the Load Distributor 110 of the sub-farm indicating the new allocation for the client on the resource instance. The Load Distributor 110 is responsible for throttling the client's incoming requests to prevent the usage of the resource beyond this allocated limit. There is a special sub-case within this case:

Case IV-A

In this case, new>current, i.e. the allocation has been increased. Typically, when the Global Decision Maker 140 increases the allocation of a particular instance, it also needs to increase the allocation of other resource classes required by the client's application. An increase in the $n^{th}$-tier resource instance without correspondingly increasing the $(n+1)^{st}$ tier has no effect—it only results in throttling of the excess requests until the $(n+1)^{st}$ tier instance has also been expanded. Because of the unpredictable delay involved in sending messages to the respective agents, in case IV-A, the Load Distributor 110 cannot immediately increase the usage of this instance. It must wait until all the dependent resource instances have also received their messages. Therefore, the RM agents are required to send acknowledgment messages back to the Resource Manager 150, which effectively implements barrier synchronization. After all the agents have confirmed that their instances have been expanded, the Resource Manager issues a "switch plan" message to all the Load Distributors 110. Upon receipt of this message, the Load Distributors 110 can switch to the new, increased allocation.

Further, if an operating-system level mechanism is available for partitioning the machine amongst clients, the RM agent is responsible for interfacing with it. Such partitioning mechanisms typically enforce strict boundaries on each application in terms of its CPU usage, disk space, network bandwidth and other similar OS-level resources. This provides secure isolation of applications from each other, besides preventing over-consumption of resources. Given the change in the client's allocation, the RM agent requests the operating system to shrink or expand the machine partition accordingly. However, if such a mechanism is not available, the system continues to function because of the independent, throttling-based mechanism which loosely enforces the allocation limits in any case.

Once the RM agents have performed the requested reallocations, the Resource Manager 150 commits the new allocation plan to the Configuration Repository 160.

Sub-farm Creation and Removal

The Resource Manager 150 is also responsible for creating and deleting entire sub-farms. When a client arrives and requests the use of a resource class that isn't currently available on the server farm, a new sub-farm must be created to execute instances of that resource class. The Resource Manager 150 queries the Configuration Repository 160 to find the available machines in the free pool that have the resource class installed. It then designates them as part of the new sub-farm, and creates an instance of a Load Distributor 110 to manage the incoming requests for this sub-farm. No resource instances are actually created at this stage. The instances get created as outlined earlier, when the Global Decision Maker 140 allocates non-zero hit-rates to them.

At some stage, a sub-farm may no longer be needed, because no clients exist that require the resource class installed on it. The Global Decision Maker 140 may decide to reclaim the machines dedicated to that sub-farm, in order to reuse them for some other sub-farm that is experiencing heavy load. It then requests the Resource Manager 150 to remove the sub-farm. The Resource Manager 150 uses its agents to shut down any resource instances (and their monitors) that may be running on that sub-farm, and then invokes the shutdown operation of the farm's Load Distributor 110 as well. Once the farm is made inactive, it updates the Configuration Repository 160 changing the status of each machine in the farm, to indicate that they are available in the free pool once more.

The Load Distributor 110 distributes incoming hits among the specific resource instances assigned to a client, so that a single instance does not get overloaded while other instances of the same resource class are relatively less loaded. It also controls the usage by clients according to the capacity allocated to them by the Global Decision Maker 140. For each subfarm comprising a set of instances of the same resource class, one Load Distributor 110 is used.

Handling Faults

The model described herein is implemented to handle machine failures in subfarms. A heartbeat mechanism is used to determine if a machine is faulty. If a faulty machine is identified, the mechanism informs the Aggregators 120. Upon receiving a fault notice, the aggregators post a notice to the system administrator. The aggregators inform the affected Load Distributors 110 to stop directing hits to the faulty machine. This information is passed along with normal load feedback information to the load distributors. It is then up to the load distributors to send the hits to other machines as far as possible, and throttle some hits if they cannot be handled.

The Aggregators 120 are modified to pass fault data to the Global Decision Maker 140 so that the Global Decision Maker 140 can remove the faulty machine from its allocation plans. Prior to preparing an allocation plan, the Global Decision Maker 140 collects the latest status of the free pool of machines (there can be new or newly fixed machines added to the pool which can be used) and takes into account all faulty machines that have to be removed.

The Resource Manager 150, as a part of its new plan deployment destroys the application instances on machines that have to be removed. The Resource Manager 150 shuts the machines down, and informs the system administrator console that the machines can be detached and fixed.

The heartbeat mechanism is used to discover faults on a machine as follows. An agent periodically polls/pings the application instances on the machine to request their availability status. The applications have to be instrumented/wrapped to respond to this agent within a time interval if they are fault free and the agent then collates the responses based on context-dependent rules as follows: The machine is faulty none of the application instances respond. The machine is not faulty if less than X percent of the application instances are faulty and there are no alternative machines available to Load Distributors 110 for handling any of the load of this machine. The machine is faulty if more than Y percent of the application instances are faulty and there are machines available in the free pool for replacing this machine. The rules are either disjoint, or applied in a well-defined order so that a deterministic answer is arrived at for the machine. Parameter like X and Y are application/context dependent, which, along with the rest of the context-dependent information is refreshed for the agent at each new deployment of a Global Decision Maker 140 plan made by the Resource Manager 150. In order to reduce the network traffic generated between a remote agent and the application instances, remote agents can be disallowed (i.e. collocate the agent with the instances). In this case, the local agent has to communicate its faults determination periodically to the relevant Aggregators 120 (without taking too long, i.e. without timing out) so that the Aggregators 120 can trust the local agent. If a local agent times out, then the relevant aggregators have to assume a failed machine and process accordingly. Since all Aggregators 120 are implemented by a common process, only one assumption is arrived at by all the aggregators and thus consistency is maintained. In case a local agent is not relied upon, the remote agent can be collocated with the aggregators to reduce the communication cost with the Aggregators 120.

The period with which the heartbeat mechanism pings for faults can be independent of the period at which load monitors are scheduled. All that is needed of the Aggregators 120 is to take the latest fault information, and then send it along with the load information to other modules.

Figure 7A:
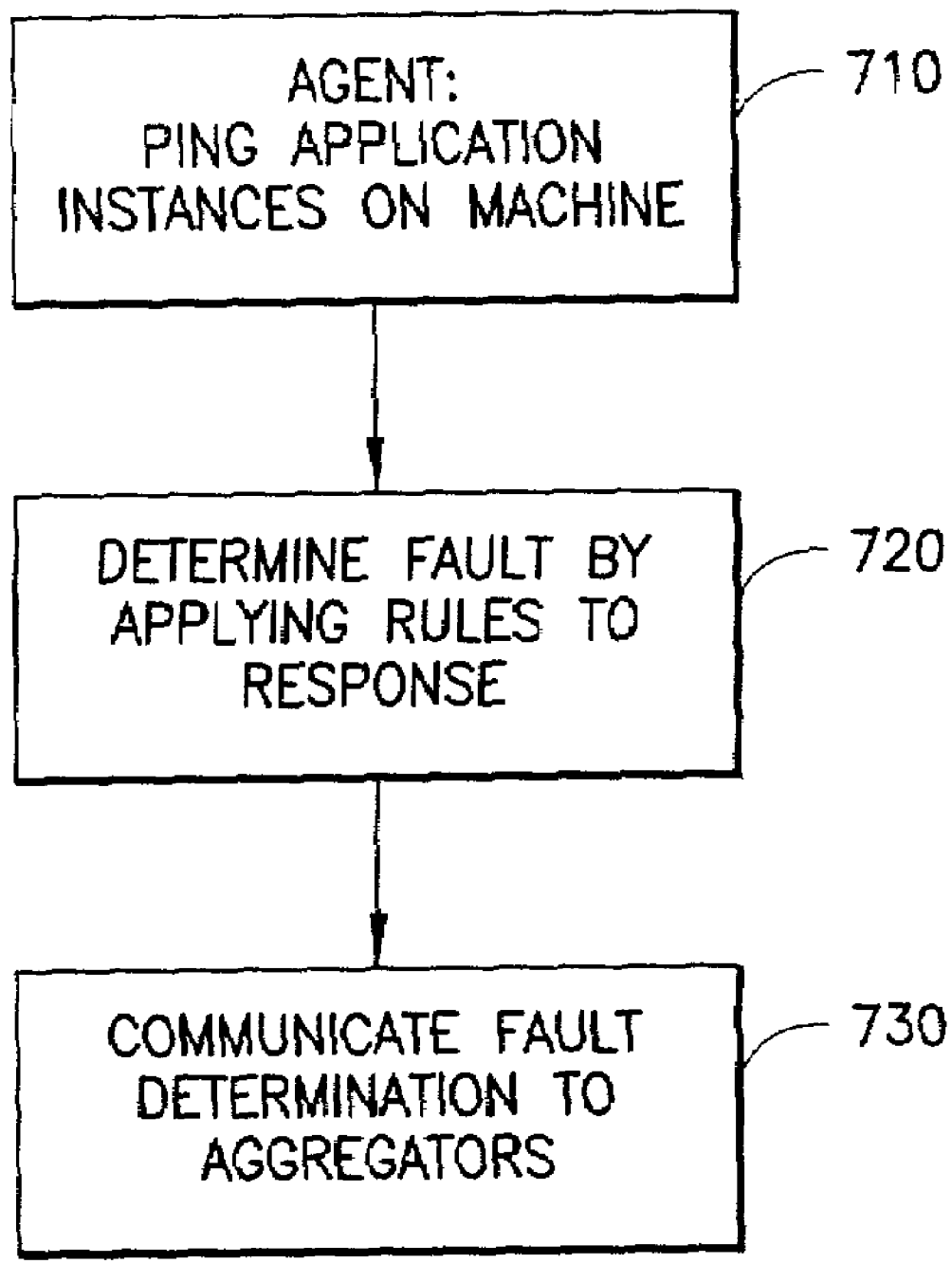
FIGS. 7A and 7B are flowcharts that schematically represent algorithms for fault detection in the system of FIG. 1, for an agent and an aggregator respectively.
Figure 7B:
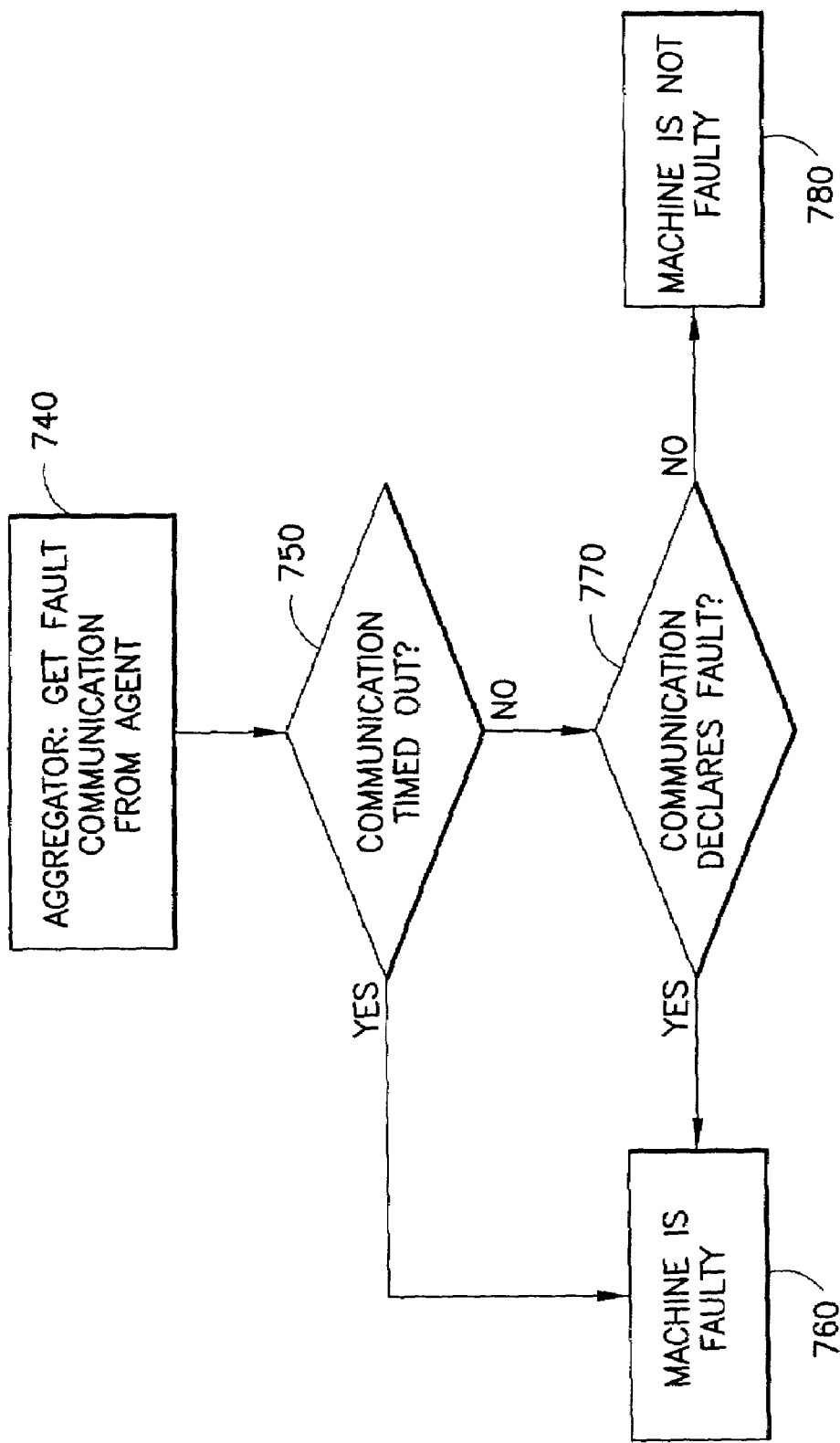

FIG. 7A is a flowchart that represents the discovery of fault on a machine by a local agent. FIG. 7B illustrates the simultaneous activity of aggregator leading to fault determination based on agent input. In FIG. 7A, in step 710, an agent pings application instances on a machine in order to test for a fault. Next, in step 720, the response from the application instances is evaluated by the agent in the light of the context-dependent rules discussed above. The evaluation leads the agent to a conclusion of a fault on the machine or not, and in step 730, the agent communicates this determination to the aggregators.

FIG. 7B is a flowchart that represents the process of fault detection on a machine by an aggregator. In FIG. 7B, an aggregator simultaneously listens for periodic communication fro an agent regarding its fault determination on a machine. In step 740, the aggregator gets a fault-related communication from an agent (corresponding to step 730 in FIG. 7A). If the communication from the agent is delayed, then in step 750, the aggregator branches to the conclusion that the machine being reported by the agent is faulty (step 760).

If the communication from the agent is not delayed, then the aggregator looks into the content of the communication to find the determination of the agent about the machine. In step 770, if the agent had determined a fault on the machine, then the aggregator branches to the conclusion that machine is faulty (step 760), or else it concludes that the machine is not faulty (step 780). The steps in FIG. 7B are repeated next when the next communication from the agent on the machine is expected.

Load Distribution

Figure 8B:
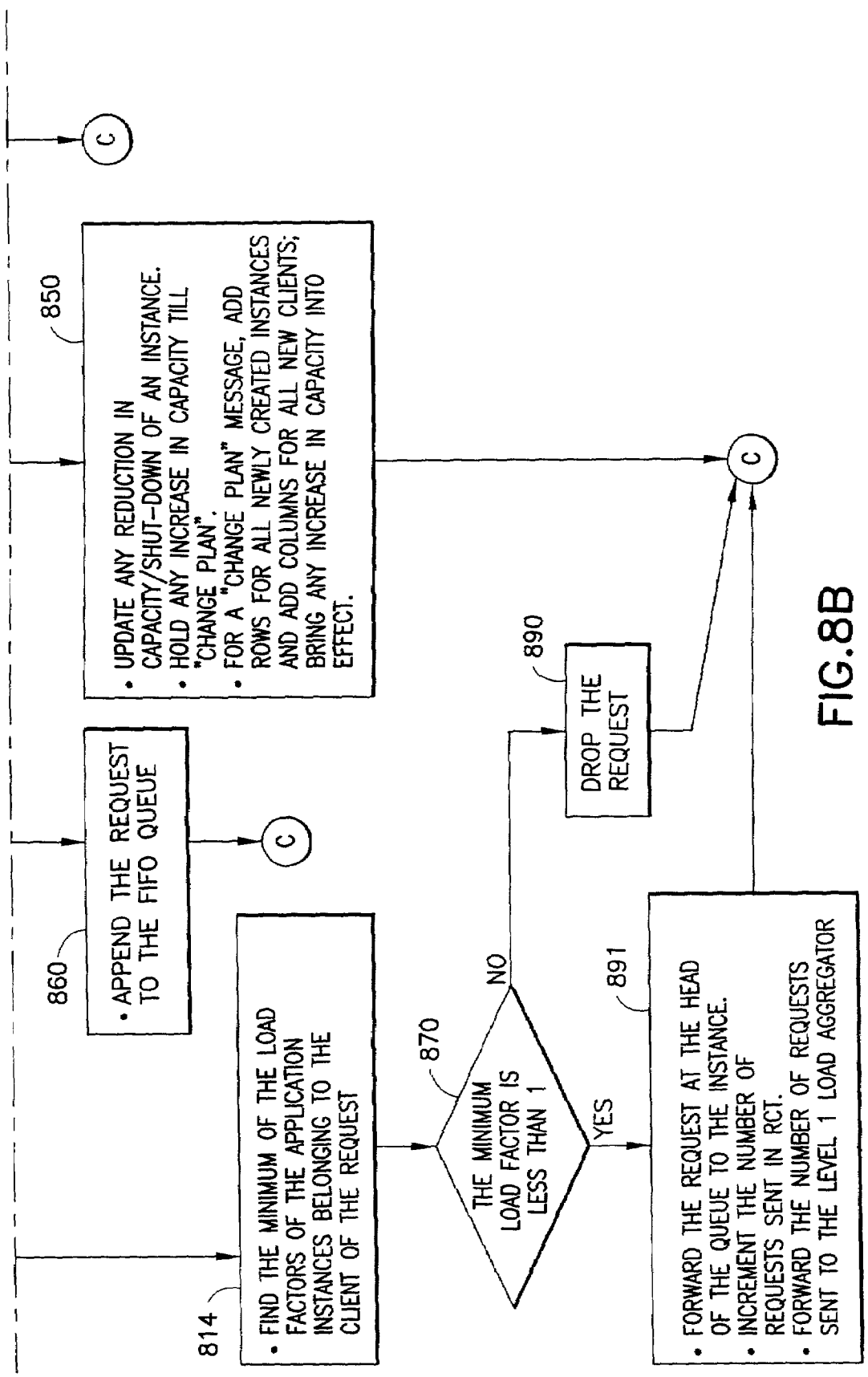

FIGS. 8A and 8B are flowcharts that represent the process involved for load distributor described above.

Upon receiving a request (step 820): The load distributor adds the received request to the tail of the queue as in step 860.

Processing of a request: The load distributor removes request R from the head of the queue in step 812. From the request R, the lead distributor identifies the client C for whose resource the request is meant. Then it finds an instance of the client's resource to which the request can be forwarded. Such an instance is the least loaded one with respect to the load information (load factor) received from the level 1 load aggregator. This is performed as in step 814. If the allocated capacity of the instance is fully consumed (load factor is greater than or equal to one) in step 870 then it drops the request in step 890. Otherwise, it forwards the request to the instance and increments a count of requests sent to that instance by one as in step 891. The load distributor send this count to the level 1 load aggregator after a time interval $\delta T$ (where $\delta T$ is much less than $T_u$), or after each request it forwards to that instance as in step 891. This is an implementation-level parameter and should be configurable at start-up time of a Load Distributor 110.

Upon receiving a message from the resource manager (step 830): If the message denotes that an instance has been shut down in step 850, then the load distributor stops forwarding any request to that instance. If it denotes that the allocation for a client in an instance has been reduced in step 850, then it takes the new allocation into account immediately. If a new instance has been created or the allocation for a client in an instance has been increased, the new value(s) are not used by the load distributor until it receives a barrier message—"switch plan" from the resource manager as in step 850. The new instance message contains information about the new instance that is created, the clients who have been allocated non-zero capacity on it, and the corresponding allocations in terms of hit rates. There may be clients who have no column for each new client in both tables after the "switch plan" message as in step 850. Similarly, if all the entries in the RAT column of a client become zero, then the RAT and RCT columns of that client are removed.

Upon receiving a message from the level 1 load aggregator: If the message contains the load factor for a client of an instance as in step 840, then the load distributor updates the value in its Resource Consumption Table (RCT). If the message denotes that an instance is down, then it stops forwarding any request to it, and removes this instance from both RAT and RCT in step 840.

System Initialization

At the time of system initialization, the machines designated to run the system management components (Global Decision maker 140, Aggregator 120, Load Monitors 130, Resource Manager 150, etc) are started which results in the execution of predefined scripts. These scripts start and initialize the respective system management components. A distributed file system is available on which all the applications are installed and a uniform view of the file system is provided on all the machines.

The initial set of customers are added to the server farm one by one by following the procedure for adding a new customer as described below.

When a new customer joins the server farm, it is hosted on an experimental setup to benchmark his applications if this information is not already available and this information is added to the configuration repository. Next, (virtual) subfarms are configured for the customer and initialized with expected loads-demands. The Global Decision Maker 140 can then allocated resources accordingly. The customer is rejected if the free pool alone cannot support it. Once Global Decision Maker 140 computes an allocation plan, it can be deployed by the Resource Manager 150, including populating the new subfarms with machines.

Computer Hardware and Software

Figure 9:
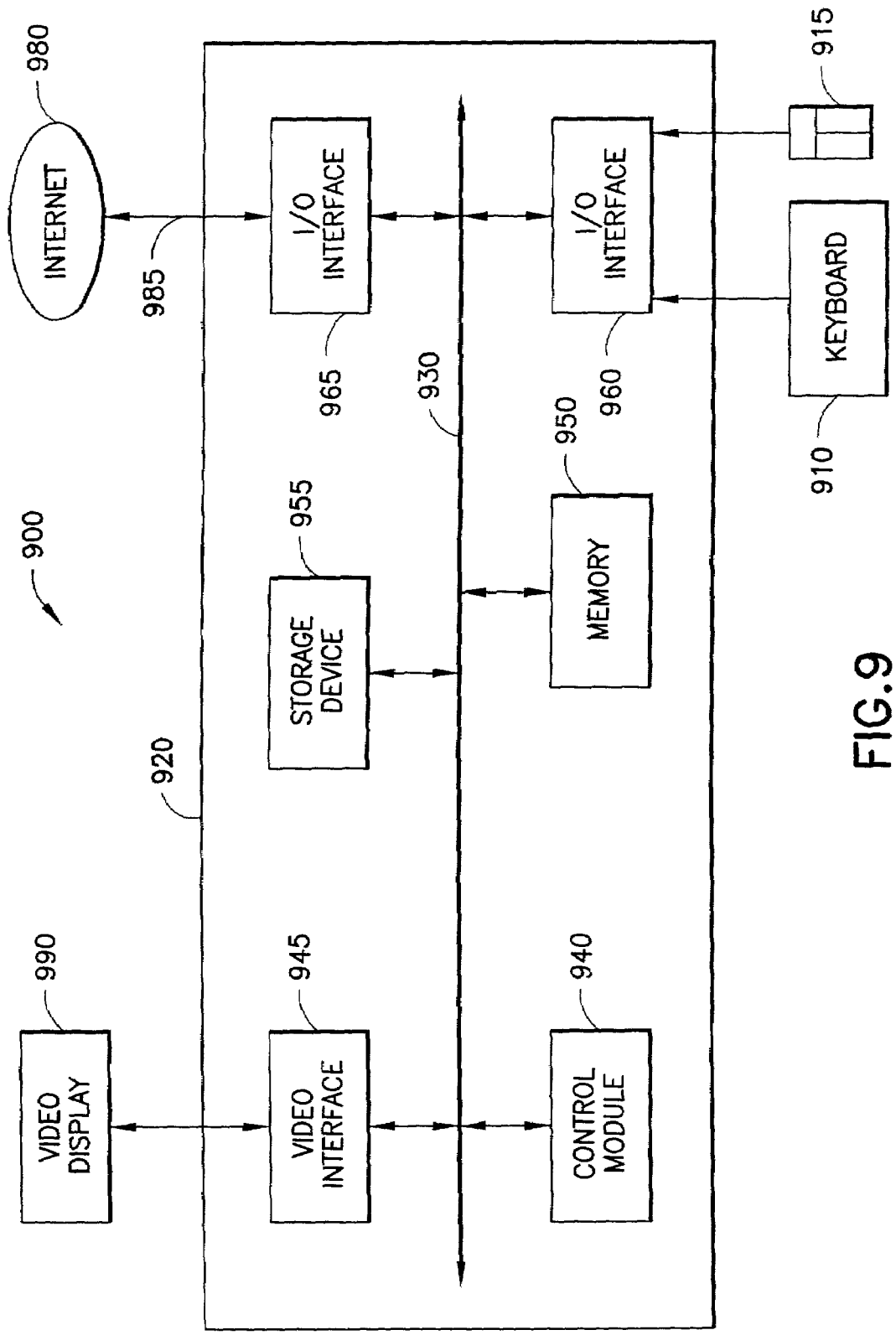
FIG. 9 is a schematic representation of an example computer system that can be used to implement the system of FIG. 1.

FIG. 9 is a schematic representation of a computer system 900 which can be used to perform steps in a process which implements the techniques described herein. The computer system 900 is provided for the purpose of executing computer software which is programmed to assist in performing the described techniques. This computer software executes under a suitable operating system installed on the computer system 900.

The computer software involves a set of programmed logic instructions that are able to be interpreted by the computer system 900 for instructing the computer system 900 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software which has a binary format suitable for execution by the operating system. The computer software is programmed in a manner which involves various software components, or code means, that perform particular steps in the process of the described techniques.

The components of the computer system 900 include: a computer 920, input devices 910, 915 and video display 970. The computer 920 includes: processor 940, memory module 950, input/output (I/O) interfaces 960, 965, video interface 945, and storage device 955.

The processor 940 is a central processing unit (CPU) that executes the operating system and the computer software executing under the operating system. The memory module 950 include random access memory (RAM) and read-only memory (ROM), and is used under direction of the processor 940.

The video interface 945 is connected to video display 990 and provides video signals for display on the video display 970. User input to operate the computer 930 is provided from input devices 910, 915 consisting of keyboard 910 and mouse 915. The storage device 955 can include a disk drive or any other suitable non-volatile storage medium.

Each of the components of the computer 920 is connected to a bus 930 that includes data, address, and control buses, to allow these components to communicate with each other via the bus 930.

The computer system 900 can be connected to one or more other similar computers via a input/output (I/O) interface 965 using a communication channel 985 to a network 980, represented as the Internet.

The computer software program may be provided as a computer program product, and recorded on a portable storage medium. In this case the computer software program is accessed by the computer system 900 from the storage device 962. Alternatively, the computer software can be accessed directly from the network 980 by the computer 920. In either case, a user can interact with the computer system 900 using the keyboard 910 and mouse 915 to operate the programmed computer software executing on the computer 920.

The computer system 900 is described for illustrative purposes: other configurations or types of computer systems can be equally well used to implement the described techniques. The foregoing is only an example of a particular type of computer system suitable for implementing the described techniques.

It is understood that various alterations and modifications can be made to the techniques and arrangements described herein, as would be apparent to one skilled in the relevant art.

We claim:

1. A method of providing access for a plurality of application-level users to an application comprising a plurality of resource class components comprising tiered layers of web servers, commerce servers, and database servers collectively executing on multiple networked machines, the method comprising:
   receiving an incoming flow of requests from application-level users to use an application and components of said application;
   providing, for each of the application-level users, respective sets of one or more application instances of each resource class component for the application on one or more machines, to service the incoming requests from respective application-level users to use the application;
   directing each of the incoming requests to a particular application instance of an appropriate resource class component;
   monitoring, for each of the application-level users, the number of request serviced by the application instances of the resource class components of the application;
   identifying, within a time constraint, failures on any of said multiple networked machines;
   changing the number of application instances of one or more resource class components in response to the monitored number of requests for each resource class component and based on machines comprising failures;
   maintaining a record of the current rate of requests received from respective application-level users, based on the monitored number of serviced requests; and
   collectively and automatically allocating fractions of different resource class components to a particular application-level user in response to the changed number of application instances of one or more resource class components by using a computational load of each request imposing on said application, wherein said computational load corresponds to a number of requests allocated for each resource instance, wherein said machines comprising failures are prevented from receiving allocations of resources.

2. The method as claimed in claim 1, further comprising directing each of the incoming requests from respective application-level users to a particular application instance of an appropriate resource class component from a respective set of one or more application instances of each resource class component said particular application instance being identified as the least loaded of the application instances of the appropriate resource class component from that respective set.

3. The method as claimed in claim 1, wherein the step of providing application instances of each resource class component further comprises:
   initiating one or more application instance of one or more resource class on a plurality of machines to service incoming requests to use the application; and
   terminating one or more application instances of each resource class on a plurality of machines to service incoming requests to use the application.

4. The method as claimed in claim 1, wherein requests from application-level users to use the application are stored in a queue for execution by a particular application instance of the appropriate resource class on a first-in-first-out basis.

5. The method as claimed in claim 1, further comprising maintaining a record of service obligations to respective application-level users.

6. The method as claimed in claim 5, further comprising changing, for each of the application-level users, the number of application instances of each resource class component in response tote monitored number of requests for each resource class component, wherein the service obligations to respective application-level users are at least met.

7. The method as claimed in claim 1, wherein said step of changing the number of application instances of said one or more resource classes is (i) at least partly based upon said recorded current rate of requests received from respective application-level users, and (ii) at least partly based on predetermined information that correlates changes in request rates with charges in the corresponding number of application instances of said one or more resource classes required to service said request rates.

8. The method as claimed in claim 1, wherein one or more of the application-level users are organizations, and the requests are generated by individuals associated with the respective organization.

9. A method of providing access for a plurality of application-level users to an application comprising a plurality of resource class components comprising tiered layers of web servers, commerce servers, and database servers collectively executing on multiple networked machines, the method comprising:
   receiving an incoming flow of requests from application-level users to use an application and components of said application;
   providing, for each of the application-level users, respective sets of one or more application instances of each resource class component to service the incoming requests from the application-level users to use the application;
   monitoring, for each of the application-level users, the resources currently available and resources currently consumed by the requests serviced by application instances of the resource class components of the application;
   identifying, within a time constraint, failures on any of said multiple networked machines;
   maintaining a record of resources currently available to respective application-level users; and a record of resources currently consumed by respective application-level users; both records of said resources being maintained in respect of each of the one or more application instances of each resource class components;
   adjusting the respective numbers of said one or more application instances of each resource class component; and
   collectively and automatically allocating fractions of different resource class components to a particular application-level user in response to a fluctuating number of application instances of one or more resource class components by using a computational load of each request imposing on said application, wherein said computational load corresponds to a number of requests allocated for each resource instance, wherein said machines comprising failures are prevented from receiving allocations of resources, and wherein said application instances of each resource class component are adjusted for each application-level user based (i) at least partly on said records of resources currently available and currently consumed by respective application-level users (ii) at least partly on predetermined information that estimates the number of each resource class components required to service requests for said application instances of the resource class components, and (iii) at least partly on machines comprising failures.

10. A system for providing access for a plurality of application-level users to an application comprising a plurality of resource class components comprising tiered layers of web servers, commerce servers, and database servers collectively executing on multiple networked machines, the system comprising:

means for receiving an incoming flow of requests from application-level users to use an application and components of said application;

means for providing, for each of the application-level users, respective sets of one or more application instances of each resource class component to service the incoming requests form respective application-level users to use the application;

means for directing each of the incoming requests to a particular application instance of an appropriate resource class component;

means for monitoring, for each of the application-level users, the number of requests serviced by the application instances of the resource class components of the application;

means for identifying, within a time constraint, failures on any of said multiple networked machines;

means for changing the number of application instances of one or more resource class components in response to the monitored number of requests for each resource class component and based on machines comprising failures;

means for maintaining a record of the current rate of requests received from respective application-level users, based on the monitored number of serviced requests; and means for collectively and automatically allocating fractions of different resource class components to a particular application-level user in response to the changed number of application instances of one or more resource class components by using a computational load of each request imposing on said application, wherein said computational load corresponds to a number of requests allocated for each resource instance, wherein said machines comprising failures are prevented from receiving allocations of resources.

11. A computer software program, recorded on a medium and capable of execution by computing means able to interpret the computer software program, for providing access for a plurality of application-level users to an application comprising a plurality of resource class components comprising tiered layers of web servers, commerce servers, and database servers collectively executing on multiple networked machines, the computer software program comprising:

code means for receiving an incoming flow of requests from application-level users to use an application and components of said application;

code means for providing, for each of the application-level users, respective sets of one or more application instances of each resource class component to service the incoming requests from respective application-level users to use the application;

code means for directing each of the incoming requests to a particular application instance of an appropriate resource class component;

code means for monitoring, for each of the application-level users, the number of requests serviced by the application instances of the resource class components of the application;

code means for identifying, within a time constraint, failures on any of said multiple networked machines;

code means for changing the number of application instances of one or more resource class components in response to the monitored number of requests for each resource class component and based on machines comprising failures;

code means for maintaining a record of the current rate of requests received from respective application-level users, based on the monitored number of serviced requests; and code means for collectively and automatically allocating fractions of different resource class components to a particular application-level user in response to the changed number of application instances of one or more resource class components by using a computational load of each request imposing on said application, wherein said computational load corresponds to a number of requests allocated for each resource instance, wherein said machines comprising failures are prevented from receiving allocations of resources.

12. A system for providing access for a plurality of application-level users to an application comprising a plurality of resource class components comprising tiered layers of web servers, commerce servers, and database servers collectively executing on multiple networked machines, the system comprising:

means for receiving an incoming flow of requests from application-level users to use an application and components of said application;

means for providing, for each of the application-level users, respective sets of one or more application instances of each resource class component to service the incoming requests from the application-level users to use the application;

means for monitoring, for each of the application-level users, the resources currently available and resources currently consumed byte requests serviced by application instances of the resource class components of the application;

means for identifying, within a time constraint, failures on any of said multiple networked machines;

means for maintaining a record of resources currently available to respective application-level users; and a record of resources currently consumed by respective application-level users; both records of said resources being maintained in respect of each of the one or more application instances of each resource class components;

means for adjusting the respective numbers of said one or more application instances of each resource class component; and means for collectively and automatically allocating fractions of different resource class components to a particular application-level user in response to a fluctuating number of application instances of one or more resource class components by using a computational load of each request imposing on said application, wherein said computational load corresponds to a number of requests allocated for each resource instance, wherein said machines comprising failures are prevented from receiving allocations of resources, and wherein said application instances of each resource class component are adjusted for each application-level user based (i) at least partly on said records of resources currently available and currently consumed by respective application-level users, (ii) at least partly on predetermined information that estimates the number of each resource class components required to service requests for said application instances of the resource class components, and (iii) at least partly on machines comprising failures.

13. A computer software program recorded on a medium and able to be executed by computing means able to interpret the computer software program, for providing access for a plurality of application-level users to an application comprising a plurality of resource class components comprising tiered layers of web servers, commerce servers, and database servers collectively executing on multiple networked machines, the computer software program comprising:

code means for receiving an incoming flow of requests from application-level users to use an application and components of said application;

code means for providing, for each of the application-level users, respective sets of one or more application instances of each resource class component to service the incoming requests from the application-level users to use the application;

code means for monitoring, for each of the application-level users, the resources currently available and resources currently consumed by the requests serviced by application instances of the resource class components of the application;

code means for identifying, within a time constraint, failures on any of said multiple networked machines;

code means for maintaining a record of resources currently available to respective application-level users; and a record of resources currently consumed by respective application-level users; both records of said resources being maintained in respect of each of the one or more application instances of each resource class components code means for adjusting the respective numbers of said one or more application instances of each resource class component in response to monitored number of requests for each resource class component and based on machines comprising failures; and code means for collectively and automatically allocating fractions of different resource class components to a particular application-level user in response to a fluctuating number of application instances of one or more resource class components by using a computational load of each request imposing on said application, wherein said computational load corresponds to a number of requests allocated for each resource instance, wherein said machines comprising failures are prevented from receiving allocations of resources, and wherein said application instances of each resource class component are adjusted for each application-level user based (i) at least partly on said records of resources currently available and currently consumed by respective application-level users, (ii) at least partly on predetermined information that estimates the number of each resource class components required to service requests for said application instances of the resource class components, and (iii) at least partly on machines comprising failures.

* * * * *